United States Patent [19]

Miyajima et al.

[11] Patent Number: 5,791,696
[45] Date of Patent: Aug. 11, 1998

[54] HOSE WITH A PROTECTOR

[75] Inventors: Atsuo Miyajima; Minoru Kawasaki; Tsutomu Kodama, all of Komaki, Japan

[73] Assignee: Tokai Rubber Industries, Ltd., Komaki, Japan

[21] Appl. No.: 736,289

[22] Filed: Oct. 24, 1996

Related U.S. Application Data

[62] Division of Ser. No. 392,968, Feb. 14, 1995, abandoned.

[30] Foreign Application Priority Data

| Jun. 14, 1993 | [JP] | Japan | 5-168499 |
| Jun. 14, 1993 | [JP] | Japan | 5-168500 |
| Nov. 11, 1993 | [JP] | Japan | 5-307441 |

[51] Int. Cl.$^6$ ............................................. F16L 21/06
[52] U.S. Cl. ........................ 285/226; 285/235; 285/222.1
[58] Field of Search .................. 285/235, 149, 285/226, 227, 222.1, 299; 92/34, 47, 37

[56] References Cited

U.S. PATENT DOCUMENTS

| 753,230 | 3/1904 | Calcutt | 285/149 |
| 1,969,203 | 8/1934 | Cadden et al. | 285/149 |
| 2,142,357 | 1/1939 | Jacobson | 285/149 |
| 2,911,736 | 11/1959 | Thibault | 285/149 |
| 3,008,737 | 11/1961 | Longfellow | 285/149 |
| 3,087,745 | 4/1963 | Rumbell | 285/149 |
| 3,204,332 | 9/1965 | Blaisdell | 285/149 |
| 3,423,109 | 1/1969 | New et al. | 285/149 |
| 3,831,635 | 8/1974 | Burton | 285/149 |
| 4,083,584 | 4/1978 | Buzzi | 285/258 |
| 4,449,740 | 5/1984 | Buzzi | 285/149 |
| 4,647,078 | 3/1987 | Lundy | 285/149 |
| 5,143,122 | 9/1992 | Adkins | 285/149 |

FOREIGN PATENT DOCUMENTS

| 56-18488 | 7/1954 | Japan . |
| 61-188087 | 11/1986 | Japan . |
| 62-174192 | 11/1987 | Japan . |
| 2-46194 | 3/1990 | Japan . |
| 3-34548 | 7/1991 | Japan . |
| 6-221481 | 8/1994 | Japan | 285/227 |
| 6-221482 | 8/1994 | Japan | 285/227 |

*Primary Examiner*—Eric K. Nicholson
*Attorney, Agent, or Firm*—Jacobson, Price, Holman & Stern, PLLC

[57] ABSTRACT

A hose with a protector includes a tubular-shaped hose body; a tubular-shaped protector which is coaxially provided to cover the outer peripheral surface of the hose body; a tubular-shaped engager which bonds the hose body and the protector integrally at both edge portions thereof and which forms an inserting opening into which a nipple is inserted and bonded. By producing the hose body out of resin and producing the protector out of rubber, the present hose with a protector can obtain heat resistance and anti-flame resistance which are suitable for a filler hose and which are necessary at the time of vehicle fire and also the present hose with a protector is good in sealing property with the mating pipe and good in connecting function.

4 Claims, 20 Drawing Sheets

(a)

(b)

(a)

(b)

(a)

(b)

(a)

(b)

(c)

(d)

(a)

(b)

(c)

(A)

(B)

(C)

(D)

(A)

(B)

HOSE WITH A PROTECTOR

This is a divisional of application Ser. No. 08/392,968, filed Feb. 14, 1995 now abandoned.

BACKGROUND OF THE INVENTION

1. Field of the Invention

The present invention relates to a hose with a protector having high resistance to harm such as heat and flame from the outer peripheral surface side. The hose with a protector according to the present invention is optimum for transferring gasoline, lamp oil and chemical drugs.

2. Description of the Related Art

As the conventional hose with a protector, the hose comprising a tubular-shaped protector which coaxially covers the outer periphery side of a hose body transferring liquid has been known. This type of conventional hose with a protector is described in Japanese Unexamined Utility Model Publication Nos. 174192/1987, 18488/1981, 188087/1986 and 46194/1990 (Kokai). In these publications, various inventions have been made so as to form the space between the hose body and the tubular-shaped protector which covers the hose body. Furthermore, concerning the joint of a hose with a protector, the invention utilizing a splicing fitting is described in Japanese Utility Model Publication No. 34548/1991 (Kokoku).

SUMMARY OF THE INVENTION

The conventional hose with a protector has a structure in which a part or the whole of the hose body is covered by a protector. Accordingly, when the conventional hose with a protector is connected to the other device, some hardware which is particularly designed is needed. Also, when the conventional hose with a protector is connected to a nipple, it is necessary to insert the nipple directly into the hose body of the hose with a protector. Therefore, it is necessary to make a hose body out of elastic rubber or elastomer and a hose body cannot be made out of resin having high rigidity.

It is an object of the present invention to solve the above-mentioned problems and to provide a hose with a protectors which is easily equipped with a nipple.

The hose with a protector of the present invention comprises: a tubular-shaped hose body; a tubular-shaped protector which is coaxially provided in the state in which it covers the outer peripheral surface of the hose body and a tubular-shaped engager which integrally bonds the hose body and the protector integrally at both ends portion thereof and forms a nipple insertion opening where a nipple is inserted and connected. In the hose with a protector according to the present invention, the engager is integrally formed, therefore it is easy to connect to the other apparatus such as a nipple or the like. Further, the engager fastens the hose body and the protector integrally, therefore the hose body and the protector are well integrated with each other.

As the hose body which comprises the hose with a protector of the present invention, the hose body of the conventional hose with a protector can be used as it is. Namely, as the present hose body, the conventional hoses such as a rubber hose, an elastomer hose, a resin hose and a double hose whose inner peripheral portion is made of resin and outer peripheral portion is made of rubber can be used. By using a resin hose as the present hose body, the present hose with a protector having improved anti-gasoline permeability can be obtained.

The portion where the hose body and the engager are contacted, namely the edge portion of the hose body, can be formed into the shape having a concave shaped ring or a convex shaped ring seen from the inner peripheral surface side which goes around in the circumferential direction. This ring serves to an engaging portion which is for improving the integral relation between the hose body and the engager or serves to an engaging portion which is directly or indirectly engaged to the convex shaped ring or the concave shaped ring which are provided at the tip portion's outer peripheral surface of the nipples which is inserted and kept into the engager. The edge portion of the hose body, which is brought into contact with the engager and which is positioned at the outer peripheral surface side of the inserted nipple and is preferably formed into a corrugated shape whose surface has concave portions and convex portions in the peripheral direction. Because of the corrugated configuration having irregularity in the peripheral direction described above, the diameter of edge portion of the hose body can be enlarged and it is easy to insert the nipple into it.

As a protector, the above-mentioned conventional protector can be used as it is. When the heat resistance and flame resistance property is required for the protector, the protector is preferably made of rubber. By forming the protector out of rubber, one can avoid the elimination caused by melting when the protector is formed out of a thermal plastic resin. Therefore, the influence of heat and flame on the hose body can be prevented for a long time.

The protector comprises a pair of portions. One edge portion of one portion of the protector is fitted into one edge portion of the other portion of the protector and they may be displaced relatively in the axial direction.

The engager can choose any of the following constructions: the engager is integrally formed with the protector; the edge portion of the protector, which is formed in advance, is inserted into the engager and they are formed integrally; the engager is formed independently from the protector and after that, the engager and the protector may be incorporated.

It is preferable that the engager is made of a rubber elastic body, its diameter is enlarged by the nipple which is inserted into the engager and the engager clamps the nipple elastically. Accordingly, the axial hole of the engager should have the shape which corresponds to the outer peripheral diameter and the outer peripheral shape of the nipple which is inserted. As the shape of the above-mentioned axial hole, the shape of the conventional axial hole can be employed.

The edge portion of the hose body is contacted with the engager. By making the engager of rubber and making the hose body of resin, the portion of the engager, which is coaxially Positioned between the nipple which is inserted and held and the hose body, can be used as the sealing portion.

The engager may be insertion molded so as to bury the edge portion of the hose body. Or the engager may be formed so as to include a ring shaped ring groove having a bottom. This ring groove opens in the ring shape on the inner peripheral surface into which the edge portion of the hose body is inserted and the depth of this ring groove becomes deeper as it is parallel in the axial direction or as it inclines to the axial direction. And the edge portion of the hose body can be inserted and engaged in the bottom-owned ring groove.

The portion, which becomes the inner peripheral surface side of the engager, may be formed in tubular shape which is integral with the portion, which becomes the outer peripheral surface side of the engager. And then, the portion which becomes the inner peripheral surface side can be formed by coaxially folding toward the inside of the portion which becomes the outer peripheral surface side. In this case, the nipple is inserted and kept by the axial hole which is formed at the inner peripheral surface side folded in. When the nipple is inserted or pulled out, there may be a fear that the inner peripheral surface side folded in may move relatively to the outer peripheral surface thereof in the axial direction by the resulting force in the axial direction. In order to avoid this relative movement, a concave portion is preferably formed at one portion at which the inner peripheral surface side and the outer peripheral surface side are contacted and a convex portion is preferably formed at the other portion thereof.

The ring groove which is formed between the inner peripheral surface side and the outer peripheral surface side which are folded can be a ring groove into which the edge portion of the hose body is inserted. Then, between the hose body which is inserted and the inner peripheral surface side which is folded in, it is preferable to form a portion with increased resistance in the axial direction. In the portion with increased resistance, a concave shaped ring or a convex shaped ring which extends in the circumferential direction can be formed at one portion and a convex shaped ring or a concave shaped ring which is shaped symmetrical to the above mentioned ring and which extends in the circumferential direction can be formed at the other portion.

By engaging the pair of rings, it is possible to integrate the hose body and the folded portion of the engager.

At the outer peripheral surface of the engager which is integrated by contact, an outer ring which fastens this outer peripheral surface in a ring shape may be provided. And at the inner peripheral surface of the edge portion of the hose body which is integrated, an inner ring in a ring shape to support the inner peripheral surface thereof may be provided. By providing the outer ring and inner ring, the integrity of the engager and the hose body is improved.

Further, the engager may be formed as the separate body from the protector and the hose body. And at the outer peripheral surface of the engager, the edge portion of the protector may be integrated by engaging it coaxially and at the inner peripheral surface of the engager, the edge portion of the hose body may be integrated by mounting it coaxially. In this case, it is preferable to provide an outer ring which fastens the outer peripheral surface thereof in ring shape to the outer peripheral surface of the protector and to provide an inner ring which supports the inner peripheral surface thereof on the inner peripheral surface of the edge portion of the hose body.

The hose with a protector of the present invention integrates the hose body and the protector at the engager. At the engager, the nipple is formed so as to be inserted and fixed. Therefore some hardware for connecting is not necessary. By forming the protector and the engager integrally, the number of components can be reduced and the manufacturing cost and the work efficiency of the assembly is improved.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENT

Having generally described the present invention, a further understanding can be obtained by reference to the specific preferred embodiment which is provided herein for purposes of illustration only and are not intended to limit the scope of the appended claims.

First Preferred Embodiment

Figure 1:
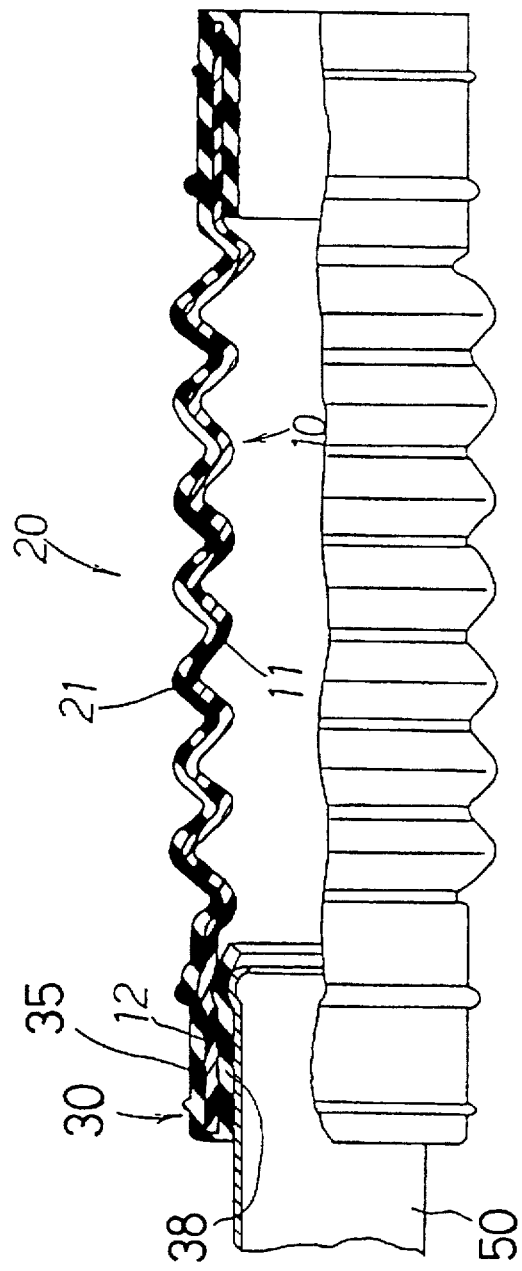
FIG. 1 is a broken fragmentary longitudinal cross sectional view of a hose with a protector of a First Preferred Embodiment of the present invention.

FIG. 1 is a broken fragmentary front view which illustrates the state in which a hose with a protector for an automobile fuel hose according to a First Preferred Embodiment is engaged with a connected pipe (nipple 50). A resin hose F comprises a tubular-shaped hose body 10 which is made of resin and which is provided inside; a protector 20 which is concentrically provided at the outside of the hose body 10 and which is made of fire resistant rubber; and an engager 30 which is integrally formed with the protector 20.

The hose body 10 is made of polyamide resin and it comprises a bellows shaped portion 11 having a predetermined length and combined edge portions 12 (hereinafter referred to as an edge portion) which is tubular shaped and which is provided at both sides of the bellows shaped portion.

The protector 20 is provided with a bellows shaped portion 21 which is substantially adhered to the bellows shaped portion 11 of the hose body 10 and an engager 30 which is integrally formed at both ends thereof. The engager 30 is extended toward the outside of edge portion 12 and a connecting portion 35 which is integrally overlapped on the outer peripheral surface of the edge portion 12 of the hose body 10. The engager 30 includes a return portion 38 which is integrally overlapped on the inner peripheral surface side of the edge portion 12. It may use elastic and fire resistant resins such as a vinyl chloride resin or the like besides rubber in order to produce the protector 20 and engager 30.

Figure 2:
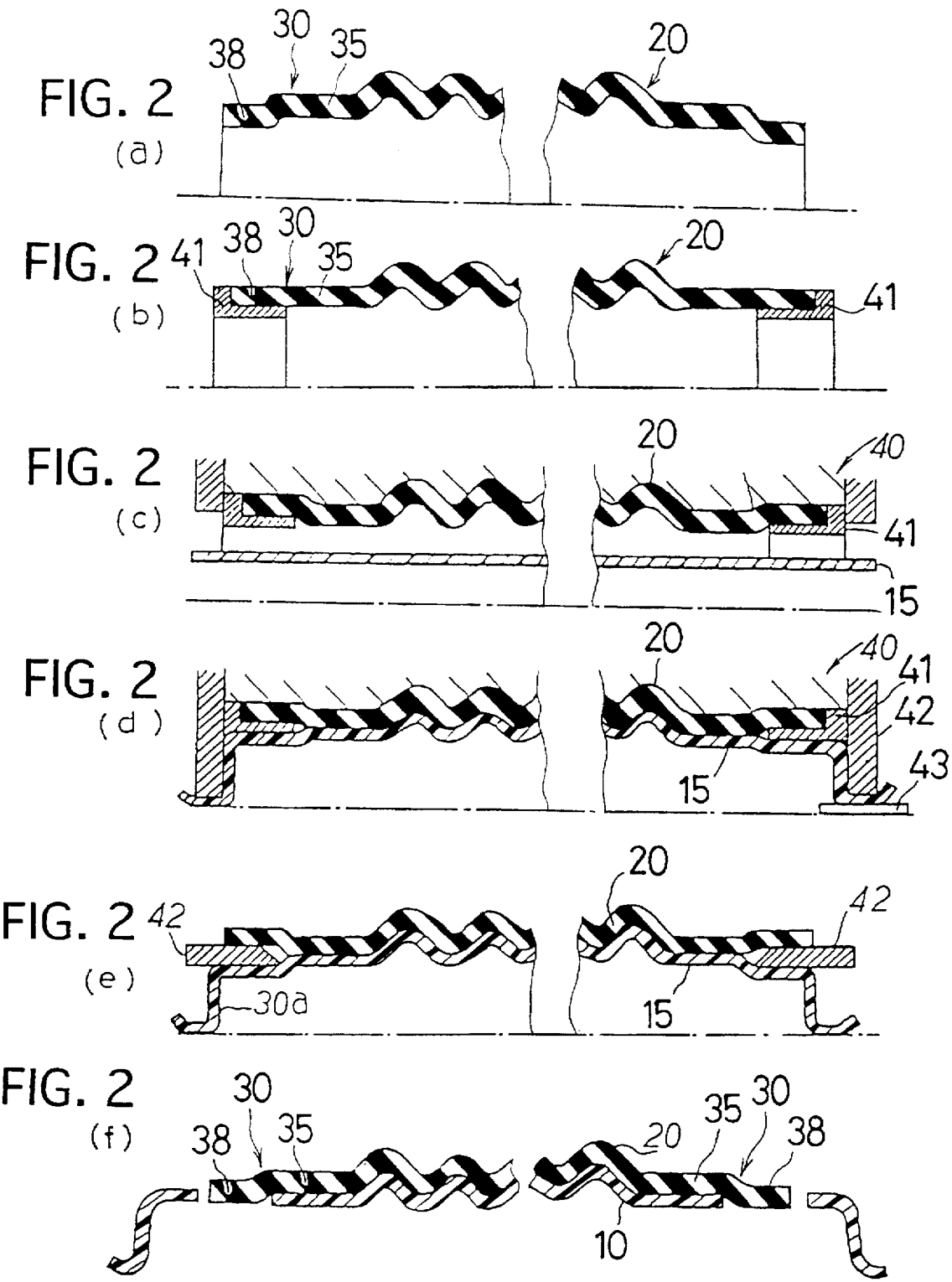
FIGS. 2(a) through 2(f) are cross sectional views which illustrates an outline of the steps of the production process of the hose with a protector of the First Preferred Embodiment.

Referring to FIG. 2, the outline of a production process of the above-mentioned hose with a protector will be explained as follows.

First as shown in FIG. 2(a), there is prepared the protector 20 which is made of fire resistant rubber and with which the return portion 38 and the connecting portion 35 is connected in tubular shape and in the axial direction. The protector having the engager 30 is generally produced by the production method of a rubber hose using a general core. Next as shown in FIG. 2(b), an edge tool 41 is inserted into and engaged with the inner peripheral surface side of the return portion 38 of both edges. Then as shown in FIG. 2(c), it is inserted into and engaged with a die 40 and a parison 15 made of polyamide resin is inserted into the axial hole of the protector 20 having the engager 30. Then as shown in FIG. 2(d), at an extrusion portion from the edge tool 41 of the parison 15, the inside of the parison 15 is excluded from outside air by a presser portion 42 at both ends of the die 40. High pressure air is blown into the inside of the parison 15 through an air supply pipe 43 which is inserted inside and the parison 15 is inflated so as to get to fit the inner wall of the protector 20 having the engager 30. After that, the protector 20 which has engager 30 and which includes the molded parison 15 is extracted from the die 40. After removing the edge tool 41, as shown in FIG. 2(e), a rotary knife 42 is inserted into the clearance thereof so as to cut off the parison 15 and the portion of the parison 15 which becomes the hose body 10. Therefore as shown in FIG. 2(f), it is able to obtain the protector 20 having the engager 30 in the state in which the return portion 38 of the edge portion is extended in the axial direction. By bending the return portion 38 at the end of this rubber protector 20, as shown in FIG. 1, the protector 20 having the engager 30 is obtained.

In the hose with a protector of this First Preferred Embodiment, the return portion 38 of the engager 30 is folded back so as to superpose on the inner side of the edge portion 12 of the hose body 10. Therefore, when the nipple 50 is fitted, the return portion 38 is located between the edge portion 12 of the hose body 10 and the nipple 50. So the hose with a protector of this First Preferred Embodiment can secure the sealing ability of the connecting portion thereof for the above-mentioned reasons. Accordingly, it is not necessary to prepare a rubber cap so as to secure the sealing ability at the portion connecting the hose body 10 and the nipple 50 as the conventional hose with a protector needs the rubber cap. Therefore a die for molding the rubber cap is not necessary and also the process for molding the rubber cap and fitting it are not needed. Accordingly, the present invention can supply the hose with a protector having improved anti-gasoline permeability and improved fire resistance at a low cost.

Second Preferred Embodiment

Figure 3:
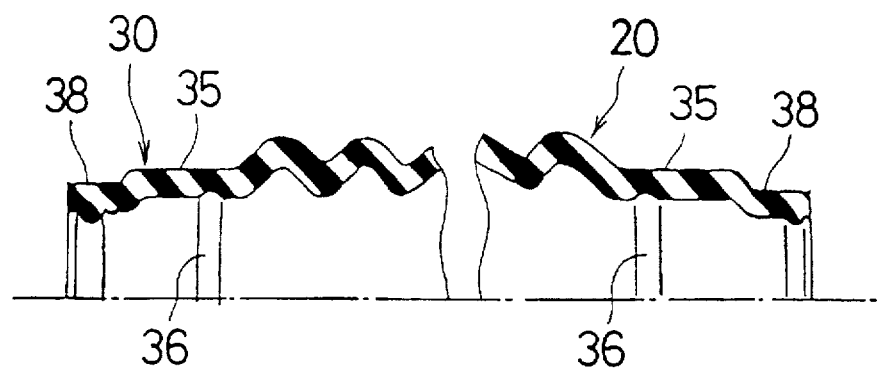
FIGS. 3(a) and 3(b) are cross sectional views which illustrate an outline of a major portion of the present hose with and without a protector irrespectively, of a Second Preferred Embodiment.
Figure 3:
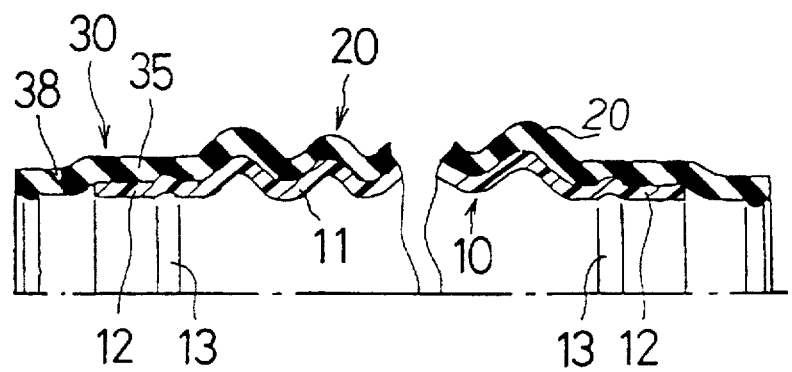

As shown FIG. 3(a), in the hose with a protector according to this Second Preferred Embodiment, a protector 20 having an engager 30 is prepared. This engager 30 has the same construction as that of the First Preferred Embodiment except that a protector of the Second Preferred Embodiment is different from the protector 20 having the engager 30 of the First Preferred Embodiment and that the Second Preferred Embodiment includes a ring groove 36 which goes around in the circumferential direction on the inner peripheral surface side of a connecting portion 35 of the engager 30. And the material of this Embodiment is the same as that of the First Preferred Embodiment.

As shown in FIG. 3(b), when a hose body 10 is formed on the inner peripheral surface side of the protector 20 with the engager 30 having the ring groove 36 by using the same method as that of the First Preferred Embodiment, a parison is formed along the ring groove 36. The ring groove 36 is overlapped so that the edge portion of the hose body 10 goes around in the circumferential direction and there is provided a concave-shaped ring 13 at the convex inner peripheral surface side and at the outer peripheral side, whose diameter is enlarged. The return portion 38 is overlapped on this concave-shaped groove of this ring 13.

In the hose with a protector of this Second Preferred Embodiment, the movement, which is relative to the return portion 38 and the edge portion 12 of the hose body 10 in the axial direction, is regulated by the ring 13 of the hose body 10. Accordingly, when the nipple is inserted and fixed, the return portion 38 is regulated to move relatively to the edge portion 12 of the hose body 10 in the axial direction. On the outer peripheral surface of the tip portion of the nipple which is inserted and fixed, there is formed a convex-shaped ring which is engaged with the concave-shaped groove so that it secures the inserting and engaging of the nipple more reliably. The insertion resistance is increased just before the inserting and engaging of the nipple and the insertion resistance is reduced at the time of engaging. So there is an advantage that one can easily know the inserting and engaging of the nipple.

Third Preferred Embodiment

Figure 4:
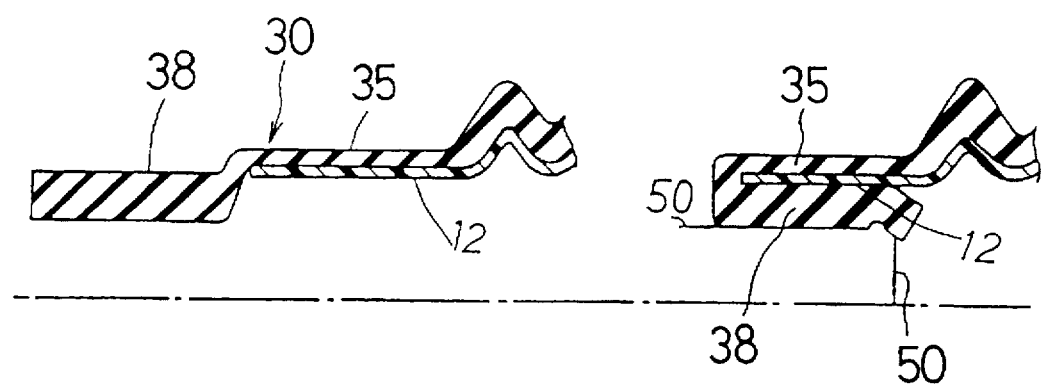
FIG. 4 is an enlarged fragmentary longitudinal cross sectional view which illustrates a connecting portion and the vicinity of returning in a return portion which comprise an engager of the present hose with a protector of a Third Preferred Embodiment.

Next, the Third Preferred Embodiment of the present hose with a protector will be hereinafter described with reference to FIG. 4. In the hose with a protector of the Third Preferred Embodiment, the return portion 38 of the engager 30 is thicker than the connecting portion 35. As mentioned above, the thickness of the return portion 38, which is deformed at the time of inserting of the nipple, is increased. Accordingly, when the nipple 50 is inserted into the hose with a protector, it becomes easy to absorb, at the return portion 38, the deformation caused by the enlargement of diameter by the nipple and it becomes easy to insert the nipple 50.

Fourth Preferred Embodiment

Figure 5:
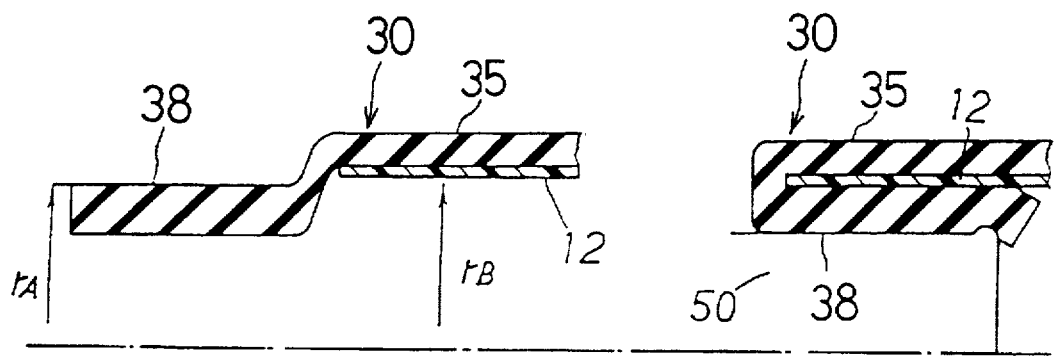
FIG. 5 is an enlarged fragmentary longitudinal cross sectional view which illustrates a connecting portion and the vicinity of returning in a return portion which comprise an engager of the present hose with a protector of a Fourth Preferred Embodiment.

Next, the Fourth preferred Embodiment of the present hose with a protector will be hereinafter described with reference to FIG. 5. In this Fourth Preferred Embodiment, the outer diameter rA of the return portion 38 of the engager 30 is smaller than the inner diameter rB of the connecting portion 35. Owing to this, when the return portion 38 is bent toward the inner peripheral surface of the edge portion 12 of the hose body 10, sagging and winkle at the overlapping portion of the edge portion 12 of the hose body 10 by the return portion 38 are hardly produced. Accordingly, the adhesion among the return portion 38, the inner peripheral side of the edge portion 12 of the hose body 10 and the nipple 50 can be improved and the sealing ability of the hose with a protector can be improved.

Fifth Preferred Embodiment

Figure 6:
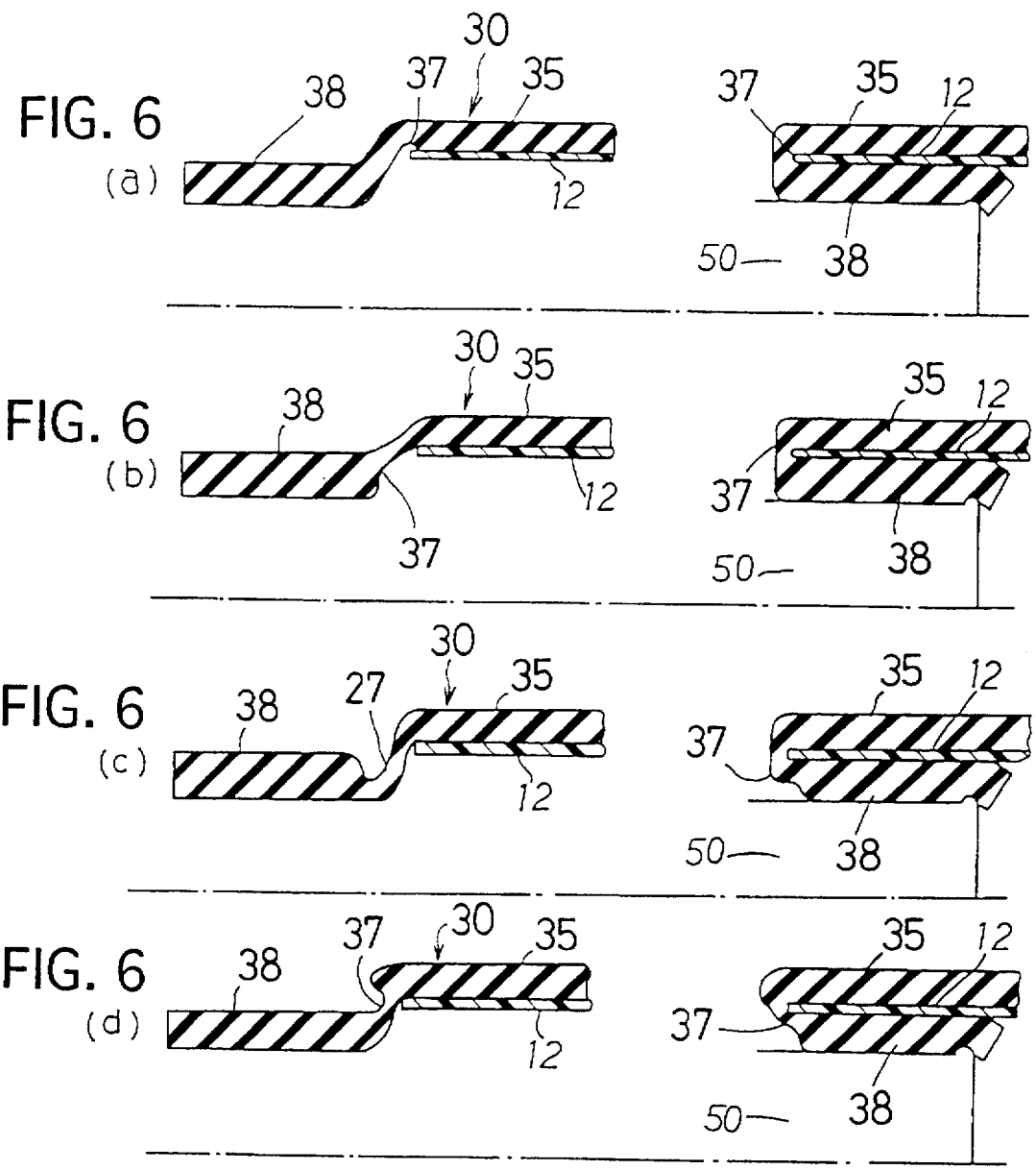
FIGS. 6(a) through 6(d) are enlarged fragmentary longitudinal cross sectional views which illustrate four alternative connecting portions and a vicinity of returning in a return portion which comprise four alternative engagers of the present hose with a protector of a Fifth Preferred Embodiment.

Next, the Fifth Preferred Embodiment of the present hose with a protector will be hereinafter described with reference to FIG. 6. As shown in FIG. 6(a), in this hose with a protector, the boundary portion 37 between the return portion 38 of the engager 30 and the connecting portion 35 is thinner than the thickness of the other portions. Owing to this, when the return portion 38 is bent, the bent portion becomes thinner and the build-up at this portion can be prevented from being generated. Because the opening portion of the hose with a protector is not narrowed, it is easy to insert the nipple 50 into the hose. As shown in FIGS. 6(b) through 6(d), the thin portions can be provided on the return portion 38 sides. Especially shown in FIG. 6(c) and 6(d), when the cavity is provided on the outer side, the opening portion of the engager 30 becomes the taper-shaped opening whose inner diameter is extended toward the opening edge in a funnel shape when the return portion 38 is folded back. Therefore it is easy to insert the nipple 50 into the engager 30.

Sixth Preferred Embodiment

Figure 7:
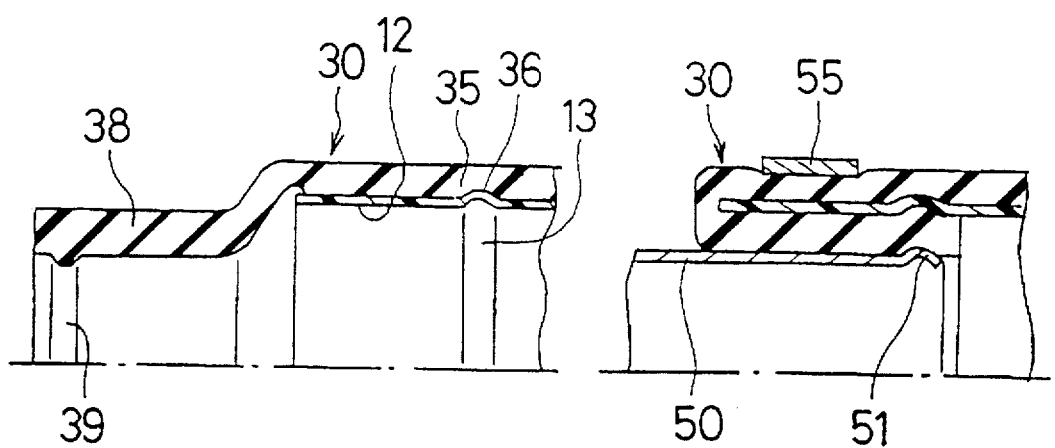
FIG. 7 is an enlarged fragmentary longitudinal cross sectional view which illustrates a connecting portion and the vicinity of returning in a return portion which comprise an engager of the present hose with a protector of a Sixth Preferred Embodiment.

Next, the Sixth Preferred Embodiment of the present hose with a protector will be hereinafter described with reference to FIG. 7. The construction of the hose with a protector according to the Seventh Preferred Embodiment is as follows: there is formed a ring 36 which goes around, in the circumferential direction, on the inner peripheral surface side of the connecting portion 35 of the engager 30 in the present hose with a protector; at the same time, there is formed a ring shaped convex 39 which is shape symmetrical to the ring groove 36 on the inner peripheral surface side of the return portion 38; furthermore, the portion which goes in contact with this ring groove 36 of the edge portion 12 of the hose body 10 becomes a convex shape at the outer peripheral surface side; at the inner peripheral surface side, there is provided a ring 13 which goes around in the circumferential direction of a concave shape and whose diameter is enlarged; this ring 13 whose diameter is enlarged is engaged with and fixed to the ring groove 36; and furthermore, the ring-shaped convex 39 of the return portion 38 is engaged with the concave-shaped ring groove 13 at the inner peripheral surface side of this ring.

In the hose with a protector of this Sixth Preferred Embodiment, as in the same manner in the Second Preferred Embodiment, the movement, which is relative to the return portion 38 and the edge portion 12 of the hose body 10 in the axial direction, is regulated by the ring 13 of the hose body 10. Accordingly, when the nipple is inserted and fixed, the return portion 38 is regulated to move relatively to the edge portion 12 of the hose body 10 in the axial direction. On the outer peripheral surface of the tip portion of the nipple 50 which is inserted and fixed, there is formed a convex-shaped ring 51 which is engaged with the concave-shaped groove of the ring 13 so that it secures the inserting and engaging of the nipple more reliably. The insertion resistance is increased just before the inserting and engaging of the nipple 50 and the insertion resistance is reduced at the time of engaging. So there is an advantage that one can easily know the inserting and engaging of the nipple 50.

In the hose with a protector according to this Six preferred Embodiment, after the nipple 50 is inserted into and engaged with the engager 30, a band-shaped clamping member 55 is installed on the outer peripheral surface of the engager 30, the engager 30 is clamped to the nipple 50 in the axial direction, and the engaging of the nipple 50 and the engager 30 is strengthened.

Seventh Preferred Embodiment

Figure 8:
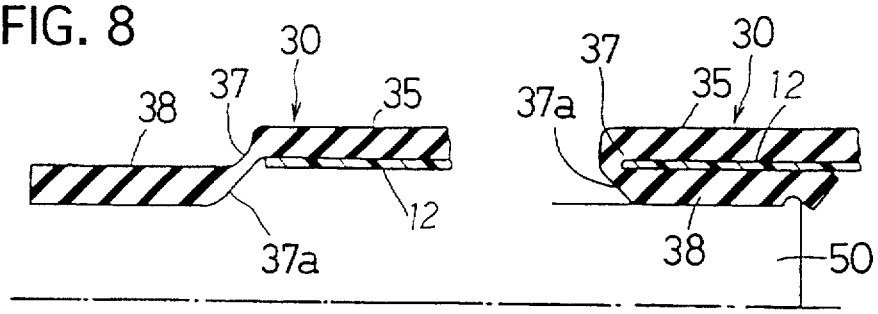
FIG. 8 is an enlarged fragmentary longitudinal cross sectional view which illustrates a connecting portion and the vicinity of returning in a return portion which comprise an engager of the present hose with a protector of a Seventh Preferred Embodiment.

Next, the Seventh Preferred Embodiment of the present hose with a protector will be hereinafter described with reference to FIG. 8. In the hose with a protector of this Seventh Preferred Embodiment, there is provided a slant 37a on the inner peripheral surface of boundary portion 37 between the return portion 38 and the connecting portion 35. Owing to this, when the return portion 38 is folded back, there is provided a slant 37a of the return portion through the outer edge portion to the inside of the hose with a protector. Therefore the nipple 50 can be easily inserted into the hose with a protector.

Eighth Preferred Embodiment

Figure 9:
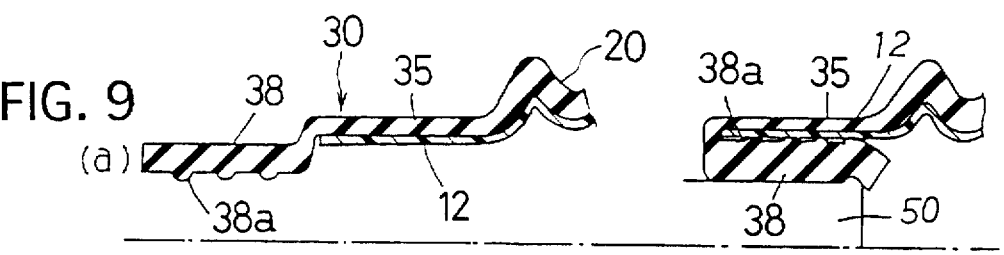
FIGS. 9(a) through 9(d) are enlarged fragmentary longitudinal cross sectional views which illustrate four alternative connecting portions and a vicinity of returning in a return portion which comprise four alternative engagers of the present hose with a protector of an Eighth Preferred Embodiment.
Figure 9:
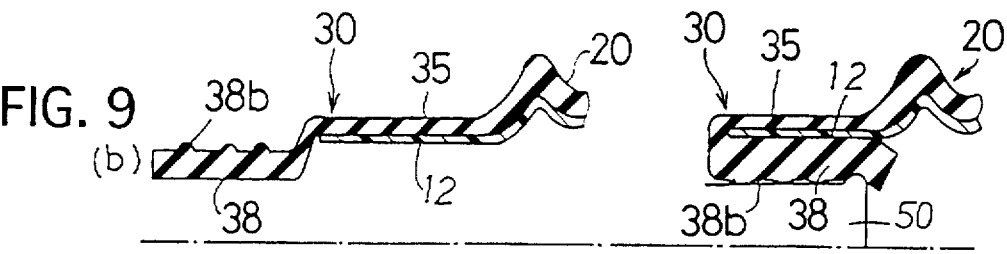
Figure 9:
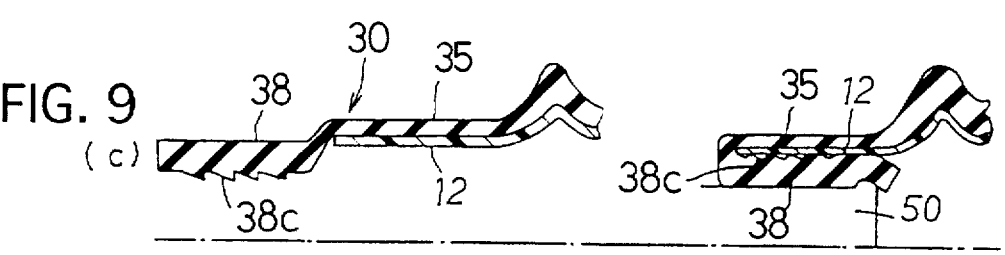
Figure 9:
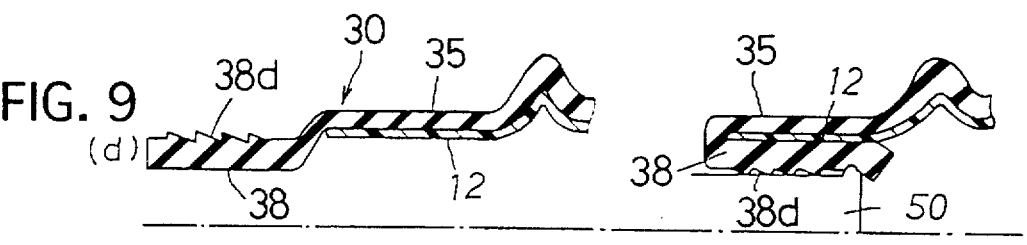

Next, the Eighth Preferred Embodiment of the present hose with a protector will be hereinafter described with reference to FIG. 9. As shown in FIGS. 9(a) and 9(b), in the hose with a protector according to the Eighth Preffered Embodiment, on at least one of the inner peripheral surface and the outer peripheral surface of the return portion 38, there are provided ring-shaped projections 38a and 38b which are perpendicular to the direction of length of the return portion 38. Owing to this, the projections 38a and 38b work the same function as that of the O-ring, therefore sealing ability of the hose with a protector can be improved. In the case which the projection 38a is provided on the inner side, when the nipple 50 is inserted into the hose with a protector, the return portion 38 is hard to be torn off when the extracting force is affected on the nipple 50. Accordingly, the nipple 50 is prevented from being extracted together with the stripping of the return portion 38. Furthermore, when the projection 38b is provided on the outer side, the opening area of the hose with a protector can be enlarged at the outer edge portion. Accordingly it is easy to insert the nipple 50 into the hose with a protector.

Concerning the shape of the projections 38a and 38b, it is not limited to be semi-circular. As shown in FIG. 9(c) and 9(d), the projections can be sawtooth shaped 38c and 38d. Furthermore, the projections can be provided on both of inner side surface and outer side surface (not shown).

Ninth Preferred Embodiment

Figure 10:
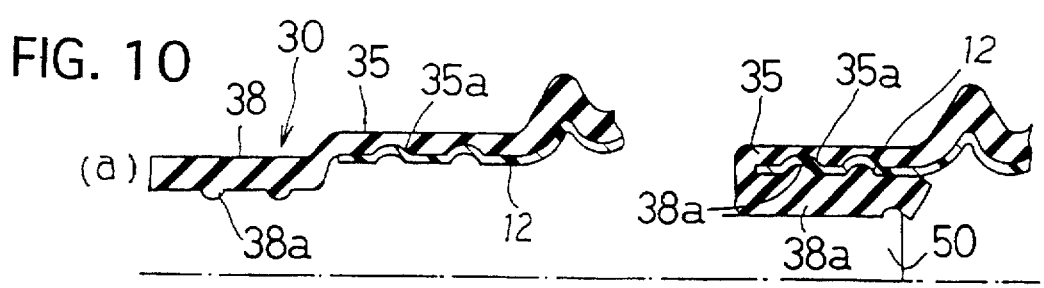
FIGS. 10(a) through 10(c) are enlarged fragmentary longitudinal cross sectional views which illustrate three alternative connecting portions and a vicinity of returning in a return portion which comprise three alternative engagers of the present hose with a protector of a Ninth Preferred Embodiment.
Figure 10:
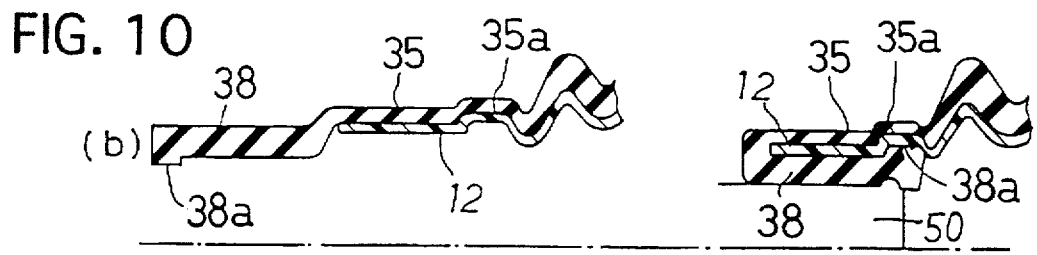
Figure 10:
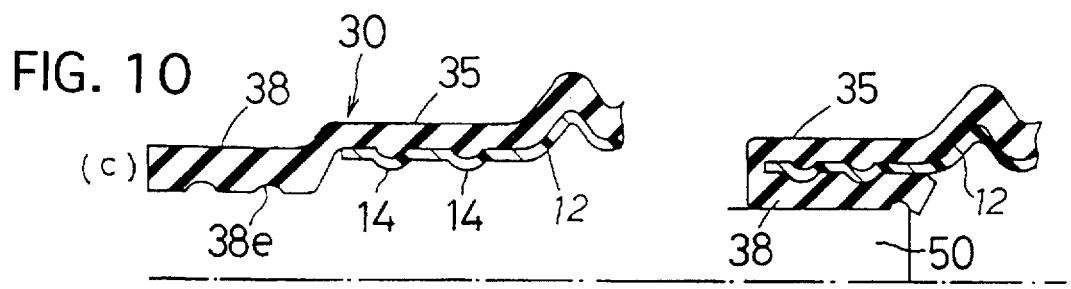

Next, the Ninth Preferred Embodiment of the hose with a protector will be hereinafter described with reference to FIG. 10. As shown in FIG. 10(a), in the hose with a protector according to the Ninth Preferred Embodiment, there is provided a ring-shaped projection 38a which is perpendicular to the direction of the length of the return portion 38 together with the ring-shaped groove 35a which is engaged with the ring-shaped projection 38a at the inner side surface of the connecting portion 35. Because the ring-shaped projection 38a is engaged with the ring-shaped groove 35a, the stripping of the return portion 38 can be prevented surely owing to the combination effect between the ring-shaped projection 38a and ring-shaped groove 35a after the nipple 50 is inserted into the hose with a protector and when the force extracting the nipple 50 is operated. As shown in FIG. 10(b), the ring-shaped projection 38a may be provided at the tip of the return portion 38 and ring-shaped groove 35a may be provided so as to combine the ring-shaped projection 38a when the return portion 38 is folded back to the connecting portion 35. Also as shown in FIG. 10(c), there can be provided a ring-shaped projection 14 at the edge portion 12 of the hose body 10 so that it may be possible to engage the ring-shaped projection 14 with the ring-shaped groove 38e which is provided at the tip of the return portion 38.

Tenth Preferred Embodiment

Figure 11:
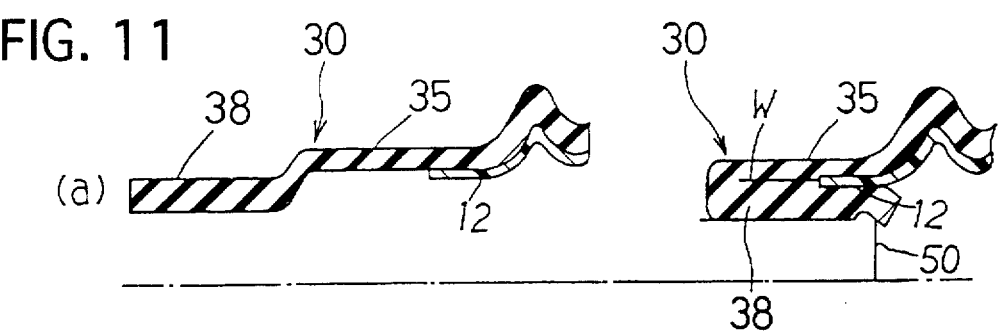
FIGS. 11(a) and 11(b) are enlarged fragmentary longitudinal cross sectional views which illustrate two alternative connecting portions and a vicinity of returning in a return portion which comprise two alternative engagers of the present hose with a protector of a Tenth Preferred Embodiment.
Figure 11:
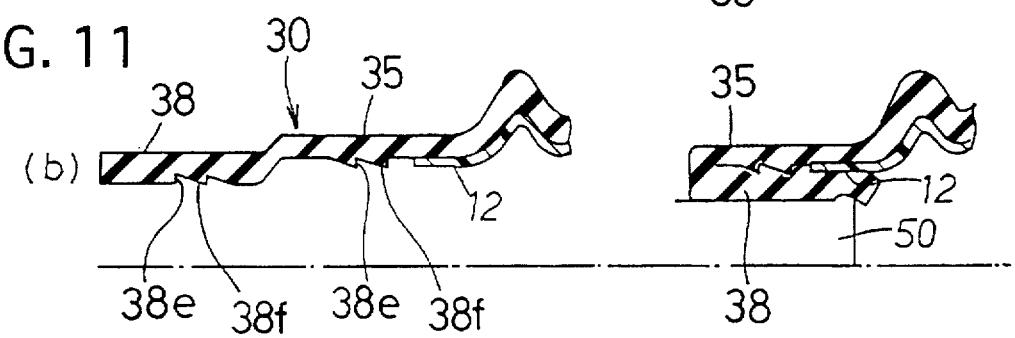

Next, the Tenth Preferred Embodiment of the present hose with a protector will be hereinafter described with reference to FIG. 11. As shown in FIG. 11(a), in the hose with a protector according to the Tenth Preferred Embodiment, there is provided the edge portion 12 of the hose body 10 so as to extend to the middle portion of the connecting portion 35 of the engager 30.

Owing to this, one part of the return portion 38 directly overlaps the connecting portion 38 on the portion which goes beyond the edge portion 12 of the hose body 10 when the return portion 38 is bent. This overlapping portion W is made of only rubber into which the edge portion 12 of the hard hose body 10 does not get, so the portion W is high in elasticity. Accordingly, it is easy to insert the nipple 50 into the engager 30. The anti-gasoline permeability in the engager 30 is ensured by the overlapping portion of the edge portion 12 of the hose body 10 of the return portion 38. As shown in FIG. 11(b), a concave portion 38e and convex portion 38f are provided at the connecting portion 35 where the return portion 38 and the edge portion 12 do not overlap and the concave portion 38e and the convex portion 38f are engaged with each other so that the nipple 50 is prevented from being extracted caused by the occurrence of strips of the return portion 38 when the extracting force is affected on the nipple 50.

Eleventh Preferred Embodiment

Figure 12:
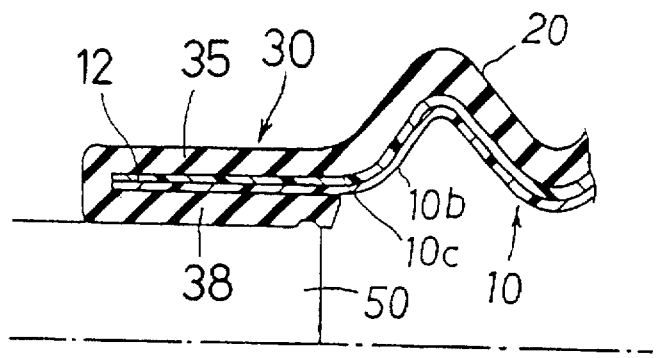
FIGS. 12(a) and 12(b) are enlarged fragmentary longitudinal cross sectional views which illustrate two alternative connecting portions and a vicinity of returning in a return portion which comprise two alternative engagers of the present hose with a protector of an Eleventh Preferred Embodiment.
Figure 12:
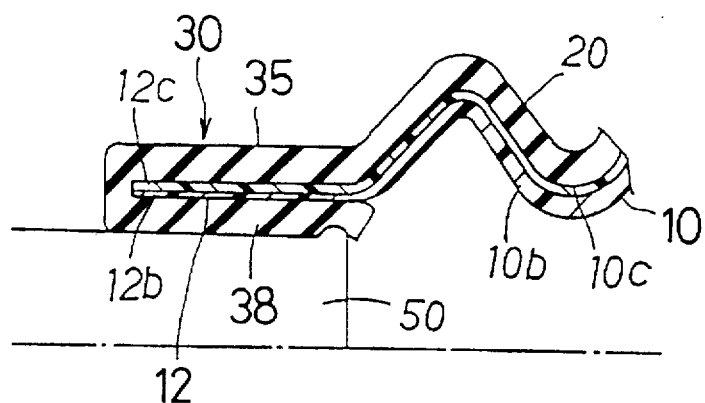

Next, the Eleventh preferred Embodiment of the hose with a protector will be herein after described with reference to FIG. 12. In the hose with a protector according to the Eleventh Preferred Embodiment, as shown in FIG. 12(a) the hose body 10 has a two-layer structure. Namely, the inner side of the hose body 10 comprises the layer 10b which has improved anti-gasoline permeability and the outer side of the hose body 10 comprises a layer 10c which has improved adhesive property. The layer 10c which has an improved adhesive property by painting an adhesive thereon or it may be obtained by surface treatments such as sodium etching treatment, plasma flame treatment and sputtering on the outer side surface of the layer 10b which has improved anti-gasoline permeability. As mentioned above, the outer side of the hose body 10 is the layer 10c which has improved adhesive property so that it is possible to directly bind the hose body 10 with the engager 30 and the protector 20. Accordingly, when the hose body 10 is thin, the hose body 10 is prevented from being indented toward the inner side (so called slip state) even when the inside of the hose is in a negative pressure state. Accordingly the selecting range of the thickness of the hose body 10 can be widened.

As shown in FIG. 12(b), the inner side of the hose body 10 may comprise the layer 10b which has improved anti-gasoline permeability, and the outer side of the hose body may comprise the layer 10c which is soft and which has improved flexibility. The thickness of the layer 10b which is at the portion beside the edge portion 12 and which is hard and has improved anti-gasoline permeability may be increased so as to improve the strength of the hose body 10. Furthermore at the edge portion 12, the thickness of the layer 10c which is the outer side layer and which has improved flexibility may be widened. By the construction mentioned above, it is easy to insert the nipple 50.

Twelfth Preferred Embodiment

Figure 13:
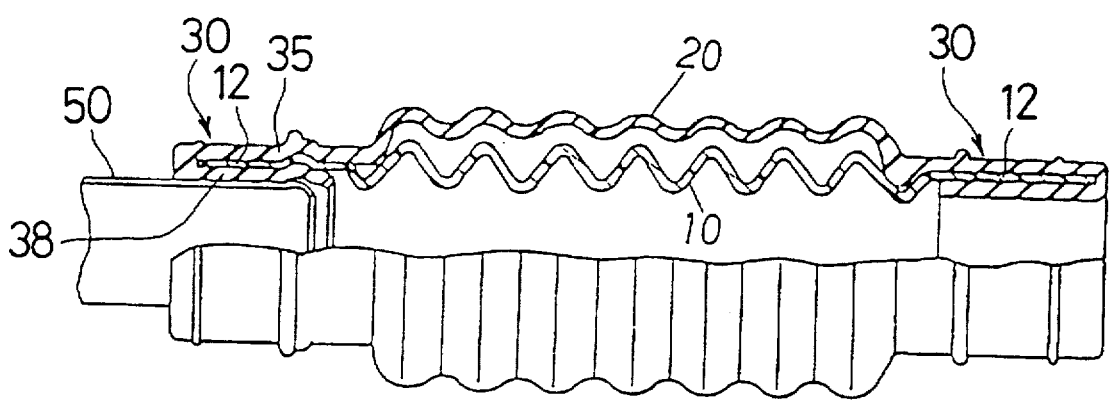
FIG. 13 is a broken fragmentary cross sectional view of a hose with a protector of a Twelfth Preferred Embodiment.

Next, the Twelfth Preferred Embodiment of the hose with a protector will be hereinafter described with reference to FIG. 13. In the hose with a protector according to the Twelfth Preferred Embodiment, there is provided a space between the hose body 10 and the protector 20 excluding the edge portion 12 so that this space may function as a heat resistant layer. The hose with a protector according to this Twelfth Preferred Embodiment is produced as follow: the hose body 10 is molded in advance being apart from the engager 30 and the protector 20; the hose body 10, which is molded previously, is later assembled to the engager 30 and the protector 20; the edge portion 12 of the hose body 10 is inserted and clamped between the connecting portion 35 and the return portion 38 of the engager 30.

A space between the hose body 10 and the protector 20 is formed. Owing to this space, the heat is excluded by the space even when the protector 20 reaches a high temperature by heating so that the heat is hard to be conducted. Accordingly, the melting of the hose body 10 is slow and the fire resistance of the hose with a protector can be improved.

By providing the space between the protector 20 and the hose body 10, both of the protector 20 and the hose body 10 tend to slide in the longitudinal direction. However edge portion 12 of the hose body 10 is inserted and clamped between the connecting portion 35 and the return portion 38 of the engager 30 so that the position of the hose body 10 is fixed. Therefore the slide between the protector 20 and the hose body 10 can be prevented from occurring.

The hoses with a protector through the First Preferred Embodiment to the Eleventh Preferred Embodiment have the structure in which the space between the hose body 10 and the protector 20 is not provided. As shown in the hose with a protector of the Twelfth Preferred Embodiment, the space between the hose body 10 and the protector 20 may be provided. The hose body 10 and the protector 20 may have bellows shapes having different pitches respectively. Accordingly, even when the hose body 10 may be made of hard resin and metal resin, the obtained hose with a protector can ensure its elasticity. The slide of the protector 20 and the hose body 10 in the longitudinal direction can be prevented by fixing the edge portion 12 of the hose body 10 to the engager 30.

In each of the above-mentioned Preferred Embodiments, the edge portion 12 of the hose 10 was inserted into and fixed to the engager 30, however the engager 30 may be adhered to the edge portion 12 of the hose body 10. By this binding, when the extracting force is acted on the nipple 50, the return portion 38 of the engager 30 is prevented from being peeled off so that the nipple 50 can be prevented from being extracted.

Also in each of the above-mentioned Preferred Embodiments, the thickness of the hose body 10 corresponds to the middle portion of the bellows shaped portion 11 and the edge portion 12, however the edge portion may be thinner compared to the thickness of the middle portion. Owing to this, the engager 30 of the hose edge portion into which the nipple 50 is inserted is improved in its elasticity. Accordingly it is easy to insert the nipple 50 into the hose. The middle portion of the bellows shaped portion 11 is generally thick, therefore the hose is not deteriorated in its anti-gasoline permeability.

Furthermore, in each of the above-mentioned Preferred Embodiments, hose body 10 is made of polyamide resin. Instead of polyamide resin, as the material of the hose body 10, the followings may be used: resins which have improved gasoline resistance and anti-gasoline permeability such as fluorocarbon resin, polyester resin, polyvinyl chloride resin, polyacetal resin, PPS resin; and metals such as stainless steel and aluminium.

Thirteenth Preferred Embodiment

Figure 14:
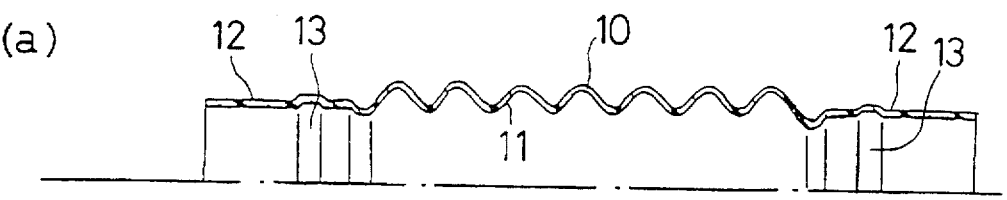
FIGS. 14(a) through 14(d) are cross sectional views which illustrate the outline of the steps of the production process of a hose with a protector of a Thirteenth Preferred Embodiment.
Figure 14:
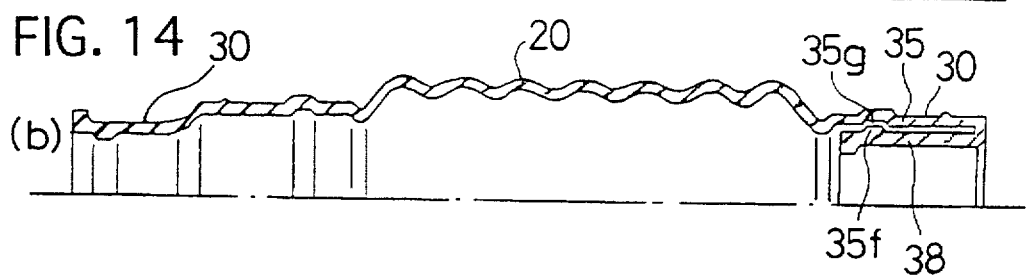
Figure 14:
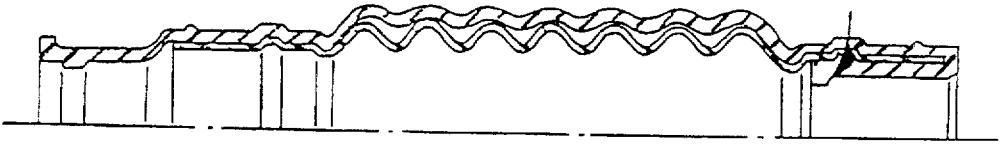
Figure 14:
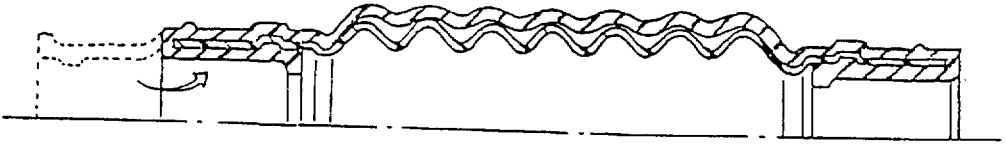

Next, the Thirteenth Preferred Embodiment of the hose with a protector will be hereinafter described with reference to FIG. 14. In the hose with a protector according to this Thirteenth Preferred Embodiment, the hose body 10 shown in FIG. 14(a) is employed. This hose body 10 is made of polyamide resin is in the same manner as that of the First Preferred Embodiment and it was produced by blow molding in advance. The engager 30 and the protector 20 are, as shown in FIG. 14(b), integrally die molded by using rubber. In this Thirteenth Preferred Embodiment, at the engager 30 shown in the right side of the FIG. 14(b), the return portion 38 is molded in the state in which the return portion is folded back in advance. The engager 30 shown in the left side of the FIG. 14(b) is molded in the state in which it is extended in the axial direction. At the connecting portion 35 of the engager 30, a ring-shaped groove 35g is formed and at the return portion 38, a ring-shaped projection 35f is formed at the position corresponding to the position of the ring-shaped groove 35g. In the state in which the return portion 38 is folded back, ring-shaped deep groove is formed having the portion whose diameter is enlarged as shown in the engager 30 of the right side in the FIG. 14(b).

In the hose with a protector according to the Thirteenth Preferred Embodiment, as shown in FIG. 14(c), the edge portion 12 of the hose body 10 is inserted into the groove between the connecting portion 35 and the return portion 38 of the engager 30 (shown on the right side of FIG. 14(c)). Finally as shown in FIG. 14(d), the return portion 38 (shown on the right side of FIG. 14(d)) is folded back to the axial center side and the hose with a protector according to the Thirteenth Preferred Embodiment is produced. At the edge portion 12 of the hose body 10, an enlarged diameter portion 13 is provided. By the diameter enlarged portion 13 of the edge portion 12, the groove 35g of the connecting portion 35 and the ring-shaped projection 35f of the return portion 38, the edge portion 12 of the hose body 10 is fixed to the groove between the connecting portion 35 and the return portion 38 without sliding in the axial direction.

In this Thirteenth Preferred Embodiment, the return portion 38 of the engager 30 is folded back in advance. Therefore the working efficiency is rather high because it is not necessary to fold back the return portion. In the case when the hose body 10 is installed to the engager 30 afterwards, the engagers 30 and 30 on both sides may be molded in the bent sate in advance.

Fourteenth Preferred Embodiment

Figure 15:
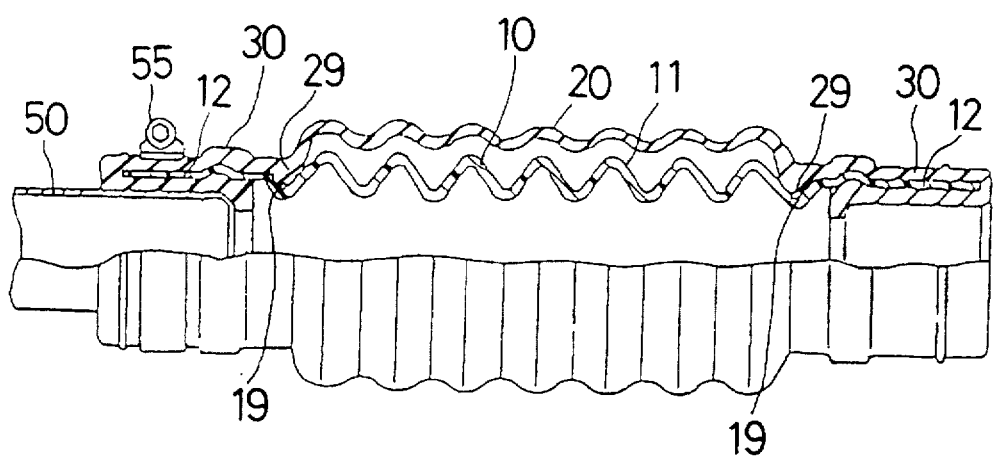
FIG. 15 is a broken fragmentary cross sectional view of a hose with a protector of a Fourteenth Preferred Embodiment.

The Fourteenth Preferred Embodiment of the hose with a protector will be hereinafter described with reference to FIG. 15. In the hose with a protector according to this Fourteenth Preferred Embodiment, at the boundary portion between the protector 20 and the engager 30, the portion 29, whose inner diameter is small, is projected in the ring shape toward the axial core side. Also at the boundary portion between the bellows shaped portion 11 of the hose body 10 and the edge portion 12, a ring groove 19 which engages with the portion 29 projecting in the ring shape in the above-mentioned axial core side is formed and engaged. Accordingly the protector 20 having the engager 30 and the hose body 10 are integrated more securely. So the possibility that the hose body 10 comes out form the engager 30 is reduced more.

In the hose with a protector according to this Fourteenth Preferred Embodiment, a fastening tool 55 is used for fastening to the nipple 50. the engager 30 is pressed toward the axial core direction from the outer peripheral side of the engager 30. Accordingly, the engager 30 is clamped by the outer peripheral surface of the nipple 50.

Fifteenth Preferred Embodiment

Figure 16:
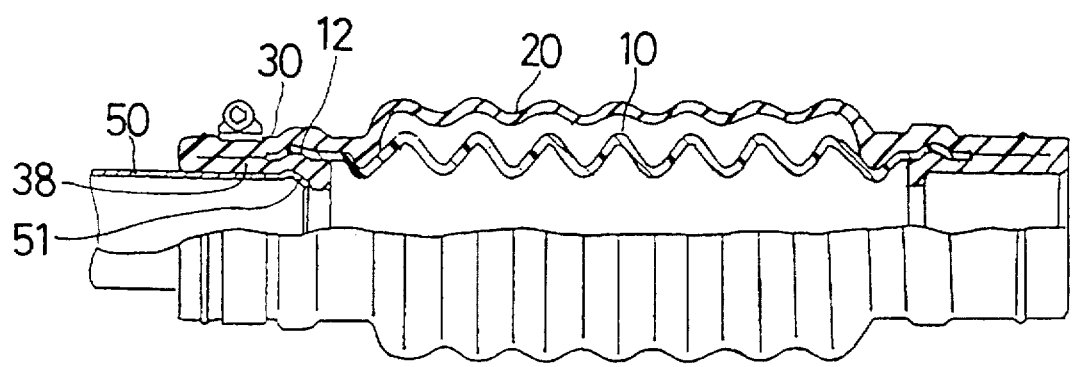
FIG. 16 is a broken fragmentary cross sectional view of a hose with a protector of a Fifteenth Preferred Embodiment.

The Fifteenth Preferred Embodiment of the hose with a protector will be hereinafter described with reference to FIG. 16. In the hose with a protector according to this Fifteenth Preferred Embodiment, the edge portion 12 of the hose body 10 which is used in the hose with a protector according to the Fourteenth Preferred Embodiment is cut short to the extent that the an enlarged diameter portion 51 at the tip side of the nipple 50 which is inserted and held can be inserted into the edge portion 12 of the hose body 10. The hard hose body 10 is not inserted into most of the engager 30 in the axial direction, therefore it is easy to insert the nipple 50. Furthermore, the tip portion of the return portion 35 of the engager 30 is clamped between the edge portion 12 of the hose body 10 and the enlarged diameter portion 51 of the nipple 50. therefore this clamping portion functions in the sealing activity. Accordingly the sealing ability is improved in this Fifteenth Preferred Embodiment.

Sixteenth Preferred Embodiment

Figure 17:
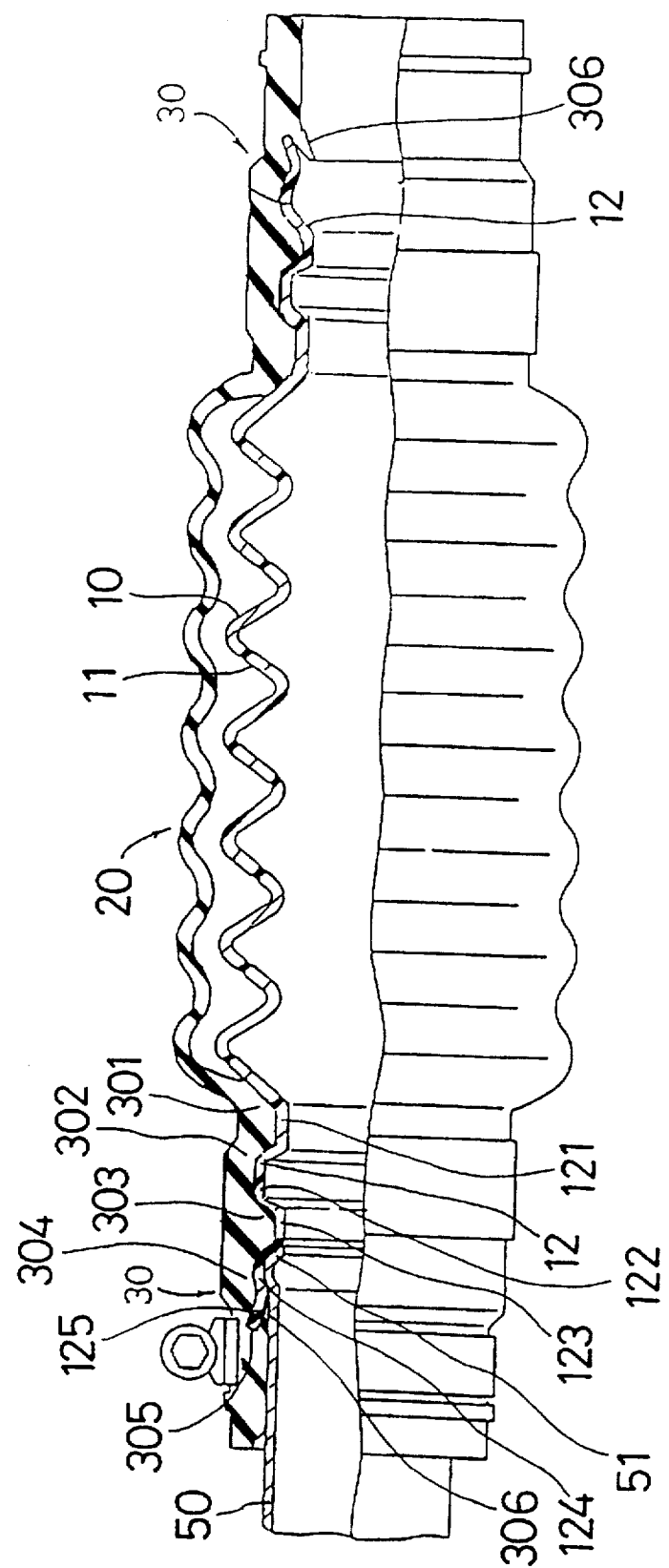
FIG. 17 is a broken fragmentary cross sectional view of a hose with a protector of a Sixteenth Preferred Embodiment.

This hose with a protector is shown in FIG. 17. This hose with a protector according to the Sixteenth Preferred Embodiment comprises the hose body 10 made of polyamide resin and the protector 20 having the engager 30 made of rubber and each of them are produced independently.

The hose body 10 comprises a bellows shaped portion 11 which is positioned at the middle portion thereof and the edge portions 12 and 12 which are integrally molded at both sides. Each of edge portions 12 and 12 respectively comprises: a first reduced diameter portion 121 whose diameter is small and which is adjacent to the bellows shaped portion 11; a first enlarged diameter portion 122 whose diameter is large; a second reduced diameter portion 123; a second enlarged diameter portion 124 whose cross section is semicircular; and trumpet-shaped edge portion 125 whose tip is flared. On the other hand, the protector 20 having the engager 30 is formed in a bellows shape whose wave is low and the engager 30 is formed so as to have more a reduced diameter and larger thickness compared with those of the protector 20. The shape of the inner peripheral surface of the engager 30 corresponds to the following portions. The following portions include: a first reduced diameter portion 301 which is shaped symmetrical to the outer peripheral surface of the edge portion 12 of the hose body 10 which is engaged with the engager; a first enlarged diameter portion 302 whose diameter is large and a second reduced diameter portion 303; a second enlarged diameter portion 304 whose cross section is semicircular; a trumpet-shaped bottom-owned groove 305 whose tip is flared; and a ring-shaped lip 306 which is formed by this trumpet-shaped bottom-owned groove. Furthermore, in the shape of the outer peripheral surface of the engager 30. the diameter through the position which corresponds to the bottom of the trumpet-shaped bottom owned groove 305 along to the edge side portion thereof is slightly smaller and a small projection is provided at the tip side.

The hose body 10 is inserted into the protector 20 having the engager 30. And the edge portions 12 and 12 of the hose body 10 are engaged with the inner peripheral surface of the engager 30 respectively. The trumpet-shaped edge portion 125 of each of edge portions 12 and 12 is pressed against and mounted on the trumpet-shaped and bottom-owned groove 305 of the engager 30. Owing to the installment of this trumpet-shaped edge portion 125, the tip of the lip in the ring-shaped lip 306 of the engager 30 is projected in the axial core side as clearly shown in the right side of the FIG. 17.

When this hose with a protector is inserted into the nipple 50, the enlarged diameter portion 51 positioned at the tip of the nipple 50 is engaged into the second enlarged diameter portion 124 of the edge portion 12 of the hose body 10, and the ring shaped lip 306 is clamped between the trumpet-shaped edge portion 125 of the edge portion 12 of the hose body 10 and the outer peripheral surface of the nipple 50. Accordingly, the ring-shaped lip 306 seals the space between the hose body 10 and the nipple 50.

In the hose with a protector according to this Sixteenth Preferred Embodiment, length the of the trumpet-shaped edge portion 125 of the hose body 10 is small in the axial direction direction. Therefore, it is easy to install the engager 30 in the trumpet-shaped and bottom-owned groove 305 and the assembling performance is improved in this Sixteenth Preferred Embodiment. Also the engager 30 and the hose body 10 of the edge portion 12 are respectively engaged with the enlarged diameter portion, reduced diameter portion and the enlarged diameter portion which are positioned continuously in the axial direction, therefore, the integrity of them is improved. Furthermore, the ring-shaped lip 306 functions as a seal, therefore the sealing property is improved.

Seventeenth Preferred Embodiment

Figure 18:
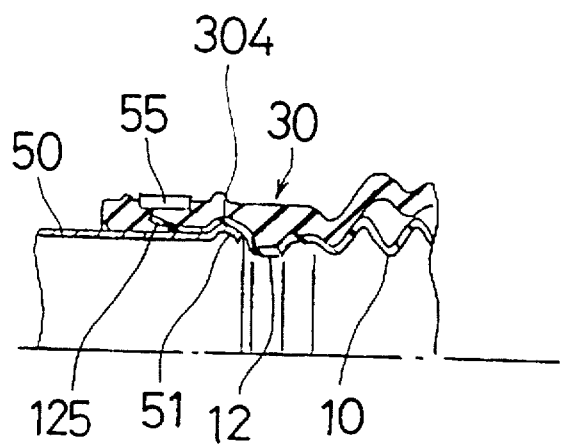
FIG. 18 is an enlarged fragmentary cross sectional view which illustrates an engager and an edge portion of the hose body of the present hose with a protector of a Seventeenth Preferred Embodiment.

The cross sectional view which illustrates the major portion of the hose with a protector according to the Seventeenth Preferred Embodiment is shown in FIG. 18. The hose with a protector according to this Preferred Embodiment has the shape which is slightly different from that of the hose with a protector according to the Sixteenth Preferred Embodiment. The differences reside in the shapes of the edge portion 12 of the hose body 10 and the inner peripheral surface of the engager 30. Namely, the space positioned between the trumpet-shaped edge portion 125 of the edge portion 12 of the hose body 10 and the the second enlarged diameter portion 304 whose cross section is semicircular is enlarged in this Seventeenth Preferred Embodiment. Owing to this, the trumpet-shaped edge portion 125 of the edge portion 12 of the hose body 10 is clamped by the engager 30 and the nipple 50, and it also clamped by the clamp 55 and nipple 50.

In the hose with a protector according to this Seventeenth Preferred Embodiment, the edge portion 12 of the hose body 10 is clamped by the clamp 55 to the nipple 50, therefore the bonding of the nipple 50 and the hose body 10 is strengthened.

Eighteenth Preferred Embodiment

Figure 19:
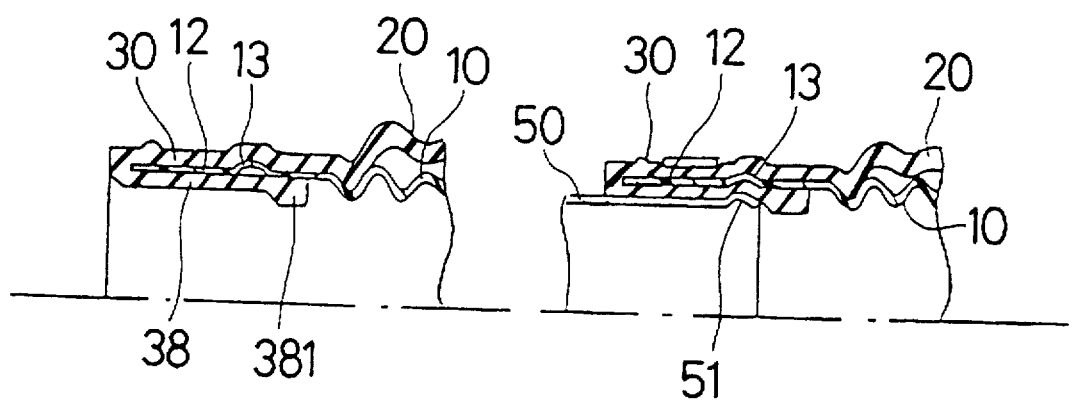
FIG. 19 is an enlarged fragmentary cross sectional view which illustrates an engager and an edge portion of the hose body of the present hose with a protector of an Eighteenth Preferred Embodiment.

The cross sectional view which illustrates the major portion of the hose with a protector according to the Eighteenth Preferred Embodiment is shown in FIG. 19. In this hose with a protector of this Eighteenth Preferred Embodiment, an enlarged diameter portion 13 is provided at the middle portion in the axial direction of the edge portion 12 thereof and there is provided a ring-shaped stopper 381 which projects toward the axial core direction at the tip of the return portion 38 of the engager 30.

The position of the enlarged direction 13 of the edge portion 12 of the present hose body 10 corresponds to the position of an enlarged diameter portion 51 of the nipple 50 into which the hose body is inserted. Accordingly, the enlarged diameter portion 51 of the nipple 50 is engaged with the enlarged diameter portion 13 of the edge portion 12 and at the same time the tip of the nipple 50 is connected and engaged with a ring-shaped stopper 381. Therefore, engaging of the nipple 50 is conducted easily.

Nineteenth Preferred Embodiment

Figure 20:
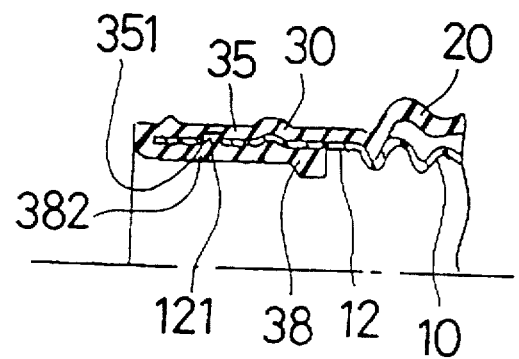
FIG. 20 is an enlarged fragmentary cross sectional view which illustrates an engager and an edge portion of the hose body of the present hose with a protector of a Nineteenth Preferred Embodiment.

The cross sectional view which illustrate the major portion of the hose with a protector according to the Nineteenth Preferred Embodiment is shown in FIG. 20. In this hose with a protector according to the Nineteenth Preferred Embodiment, at the tip portion of the edge portion 12 of the hose body 10 thereof, a plurality of through holes 121 are provided in the circumferential direction and in the ring shape. At the connecting portion 35 of the engager 30, a concave 351 is formed at the position corresponding to the through hole 121 of the edge portion 12 and a convex portion 382 which engages with the concave portion 351 is formed at the position corresponding to the through hole 121 of the return portion 38. When the return portion 38 is returned, this convex portion 382 penetrates the through hole 121 and it is engaged with the concave portion 351 of the connecting portion 35. By the engaging of the convex portion 382 and the concave portion 351, the return portion 38 is integrally connected by the connecting portion 35. Owing to this, when the nipple is extracted, the return portion 38 is prevented from being extracted from the connecting portion 35.

Twentieth Preferred Embodiment

Figure 21:
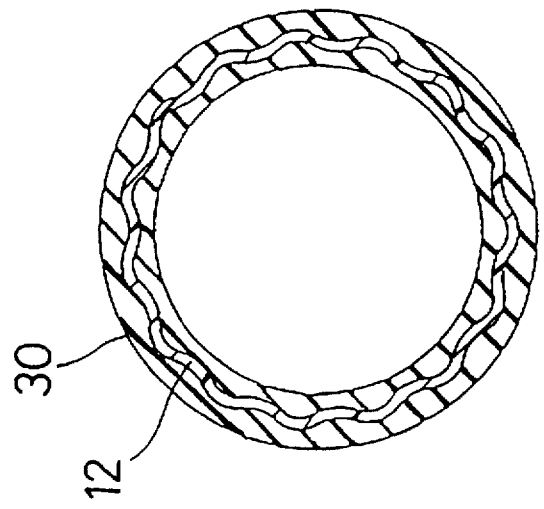
FIG. 21(a) is an enlarged fragmentary cross sectional view which illustrates an engager and FIG. 21(b) is a sectional view taken along line 21—21 of; an edge portion of the hose body of the present hose with a protector of an Twentieth Preferred Embodiment.
Figure 21:
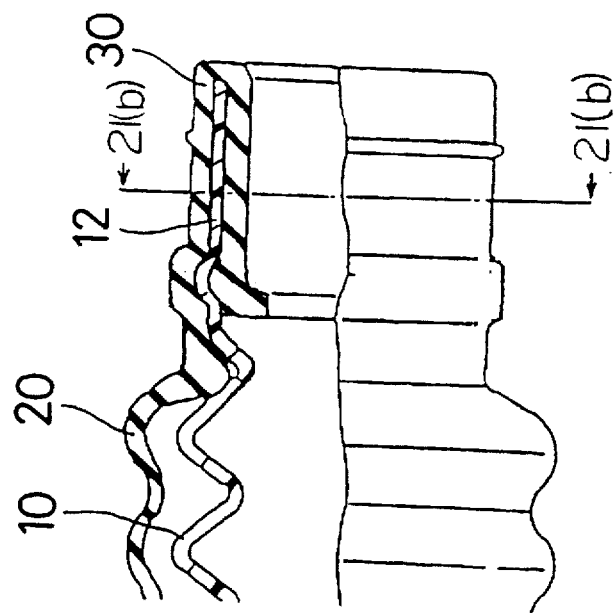

The cross sectional view which illustrates the major portion of the hose with a protector according to the Twentieth Preferred Embodiment is shown in FIG. 21(a). The cross sectional view of the hose with a protector of this Twentieth Preferred Embodiment is as shown in FIG. 21(b) and the diameter of the edge portion 12 of the hose body 10 can be enlarged and this edge portion has the wave shape having irregularity in the circumferential direction. The ring groove provided at the engager 30 formed integrally with the hose body 10 has also the wave shape having irregularity in the circumferential direction so as to suit the cross-sectional shape of the edge portion 12.

In the hose with a protector of this Preferred Embodiment, the edge portion 12 of the hose body 10 has the wave shape having irregularity in the circumferential direction. Therefore, enlarging and reducing diameter of the edge portion 12 can be conducted easily. Accordingly, it is easy to mount the nipple at the engager 30.

Twenty-first Preferred Embodiment

The Twenty-first Preferred Embodiment of the hose with a protector will be hereinafter described with reference to FIG. 22. The characteristic feature of the hose with a protector of this Twenty-first Preferred Embodiment resides in the fact that the protector 20 is formed of two components which are in the engaging relation in which they can be moved relatively in the axial direction with respect to each other. Namely, the protector 20 comprises a first protector 23 whose outer peripheral radius is small and a second protector 24 which covers the first protector 23 coaxially and whose inner peripheral radius is big. The first protector 23 and the second protector 24 are in a telescoping relation and the portion where both of them overlap each other can be enlarged. The engagers 30 and 30 are formed integrally at the edge portions of the first protector 23 and the second protector 24 respectively.

Figure 22:
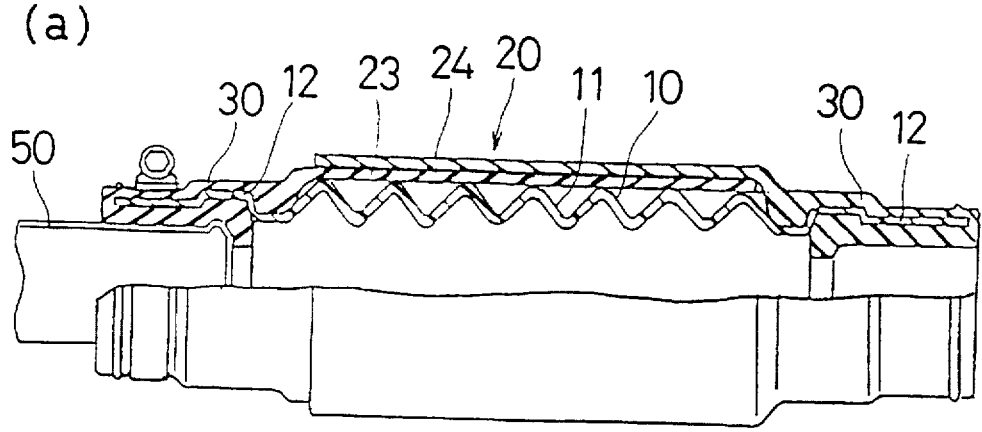
FIG. 22(a) is a broken fragmentary cross sectional view of the present hose with a protector of a Twenty-first Preferred Embodiment.
FIG. 22(b) is a fragmentary cross sectional view of the present hose with a protector of a Twenty-first Preferred Embodiment and FIG. 22(c) is an outer appearance view which illustrates the outline of the present hose with a protector of a Twenty-first Preferred Embodiment.
Figure 22:
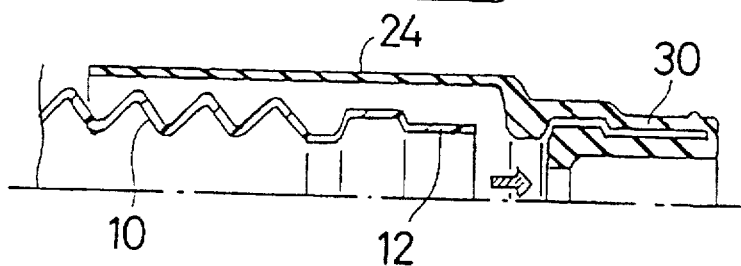
Figure 22:
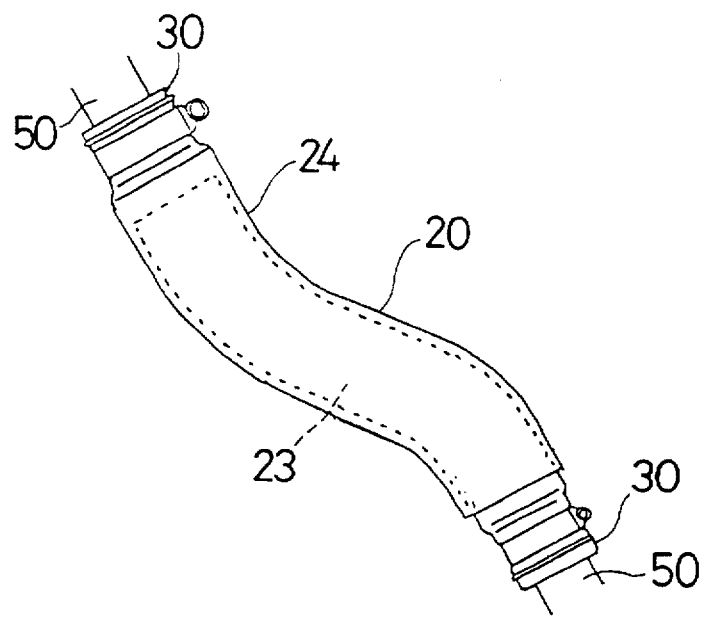

The hose with a protector of this Twenty-first Preferred Embodiment is, as shown in FIG. 22 (b), produced as follows: the first protector 23, the second protector 24 and the hose body 10 are produced individually; then, the assembly is accomplished by mounting the edge portions 12 of the hose body 10 at the ring groove of the engagers 30 which are formed integrally with the first protector 23 and the second protector 24 respectively. Because a pair of the engagers 30 and 30 are formed as the separate components, each of edge portions 12 and 12 of the hose body 10 can be inserted into the ring grooves of the engagers 30 and 30 respectively so that the inserting operation can be conducted very easily.

As shown in FIG. 22(c), the hose with a protector of this Twenty-first Preferred Embodiment has high flexibility because the protector 20 can be expanded in the axial direction. Also it is not necessary to form the protector 20 into the bellows shape so that the die cost is low. Furthermore, the same protector can be used for a plurality of hoses with protectors having different lengths of the hose bodies 10 in the axial direction.

Twenty-second Preferred Embodiment

Figure 23:
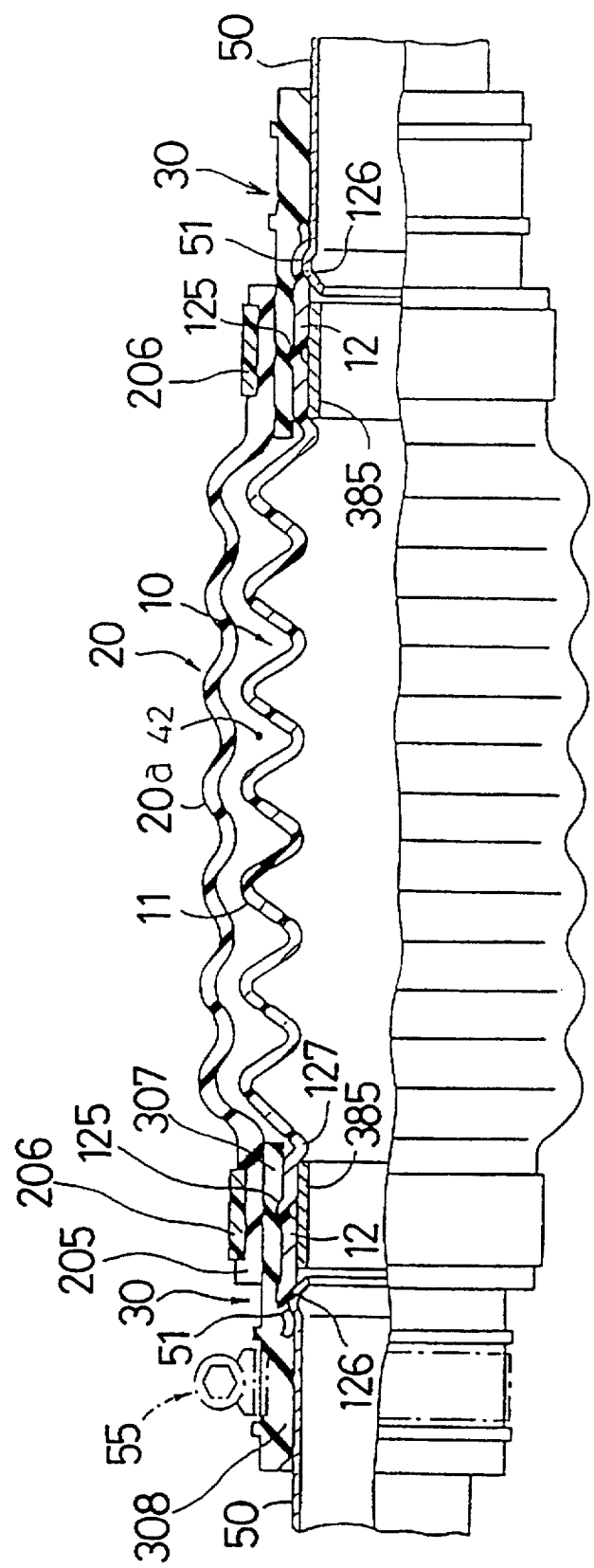
FIG. 23 is a broken fragmentary cross sectional view of a hose with a protector of a Twenty-second Preferred Embodiment.

The Twenty-second Preferred Embodiment of the hose with a protector will be hereinafter described with reference to FIG. 23. This hose with a protector of this Twenty-second Preferred Embodiment comprises a hose body 10 made of resin, a protector 20 made of rubber and an engager 30 made of rubber.

The hose body 10 comprises bellows shaped portion 11 and edge portions 12 and 12 which are formed integrally at both ends thereof. At each of edge portions 12 and 12, enlarged diameter portions 125 and 125 project toward the outside in a radial direction from a middle position taken along the axial direction and which are ring shaped. And at the tip of the enlarged diameter enlarging portion 125, a ring shaped groove 126 is formed. At this ring shaped groove 126, a ring-shaped enlarged diameter portion 51 of the nipple 50 of the mating pipe is engaged elastically.

On the other hand, at the inner peripheral surface of the edge portion 12, a hard ring 385 is engaged. Hence, the hard ring 385 may be made of resin or metal.

At the boundary portion of the edge portion 12 and the bellows shaped portion 11, a ring-shaped projection portion 127 is formed and it projects toward the inside in a radial direction. This projection 127 determines the position of the hard ring 385.

The protector 20 comprises edge portions 205 which are thick and cylindrical shaped and bellows shaped portion 20a which is positioned between them. A predetermined space is formed between each of bellows shaped portions 20a and 11 of the protector 20 and the hose body 10. The portion between them is an air layer 42.

The engager 30 is a short cylinder member and at that member, a fixed portion 307 and an engaging sealing portion 308 are formed in the axial direction continuously. At this engager 30, the fixed portion 307 is clamped by the hose body 10 and each of edge portions 12 and 205 of the protector 20 in a sandwiched and they are engaged. Furthermore, by using the hard ring 385 and resin ring 206 which is provided on the outer surface of the edge portion 205 of the protector 20, the fixed portion 307 and each of edge portions 12 and 205 of the hose body 10 and the protector 20 are clamped and pressed from inner and outer surfaces and they are fixed which each other.

In the state in which the hose body 10, the protector 20 and the engager 30 are set in an injection die, this resin ring 206 is molded by injection so that together with the hard ring 385, the fixed portion of the hose body 10, the protector 20 and the engager 30 are in the pressed state.

Instead of using the resin ring 206 formed by injection molding, a metal ring may be used to be caulked secure.

The engager 30 is directly engaged with the outer peripheral surface of the nipple 50 at engaging sealing portion 308 which continues to the fixed portion 307 and furthermore the engager 30 is clamped by the clamping member 55.

The hose body 10 of this Twenty-second Preferred Embodiment is made of polyamide resin, the protector 20 is made of CR rubber and the engager 30 is made of NBC PVC rubber.

However, the hose body 10 may be a resin single layer and it also has the laminated structure having more than two layers. In this Twenty-second Preferred Embodiment, the resin material is blow molded to form the hose body 10.

Here, the materials for the protector 20 and the engager 30 can be selected from suitable materials.

The dimensions of the whole of and each member of the hose with a protector in this Twenty-second Preferred Embodiment are as follows: the total length of the hose is 240 mm; the thickness of the bellows shaped portion 11 of the hose body 10 is 0.5 mm; each pitch of each bellows of the bellows shaped portion 11 is 6 mm; and the height thereof is 6 mm.

In the protector 20, the thickness of the bellows shaped portion 206 is 2 mm, the thickness of the cylinder shaped edge portion 205 is 2 mm. Furthermore, in the engager 30, the length in the axial direction is 60 mm, the thickness of the fixed portion 307 is 4.5 mm and the thickness of the engaging sealing portion 308 is 5 mm. The resin ring 206 is made of polyamide resin. These dimensions are cited only for examples.

In the hose with a protector of this Twenty-second Preferred Embodiment, the hose body 10, the protector 20 and the engager 30 are integrally assembled. Accordingly, only if the engaging sealing portion 308 of the engager 30 is inserted into the nipple 50 of the mating pipe and clamps it, the hose with a protector comprising the hose body 10, the protector 20 and the engager 30 can be easily connected with the nipple 50. Therefore the connecting working performance is improved.

The engager 30 is elastic and it is very well adhered to the nipple 50 without clearance and the sealing performance is also good.

Furthermore, in this Twenty-second Preferred Embodiment, the tip of the hose body 10 overlaps the tip of the nipple 50 in the elastically engaging state and the adherence state so that the sealing performance is good and the engager 30 is not directly exposed to liquid (such as gasoline) at the inside thereof. Accordingly, the deterioration of the engager 30 by gasoline is inhibited from occurring and at the same time, the engager 30 prevents gasoline at the inside from permeating to the outside very well. Furthermore, the position of engaging the nipple 50 and the tip of the hose body 10 is prevented from sliding so that the reliability at the connecting portion is improved.

Furthermore, the hose body 10 is made of resin and it has improved anti-gasoline resistance and anti-gasoline permeability. On the other hand, because the protector 20 made of anti-flame rubber is provided at the outside thereof, the hose body 10 has improved heat resistance and flame resistance.

It is not necessary to employ expensive materials such as fluoro-rubber, therefore the cost of the hose with a protector of this Twenty-second Preferred Embodiment can be reduced.

Furthermore, in this Twenty-second Preferred Embodiment, the edge portion 12 of the hose body 10 and the engager 30 are engaged in the adhered state and they are clamped and pressed by the hard ring 385 and the resin ring 206 through the edge portion 205 of the protector 20 from both internal and external surfaces. Also, at the edge portion 12 of the hose body 10, the ring projection 125 which projects in the axial direction and outward is formed. This projection 125 is in the state which the projection 125 bites into the engager 30 so that the sealing property of the engaging portion of the hose body 10 and the engager 30 is also improved.

In the case of the hose with a protector of this Twenty-second Preferred Embodiment, the engager 30 and the protector 20 are produced as separate bodies, therefore, there is an advantage that the engager 30 and the protector 20 can comprise separate rubber materials which have different characteristics.

Namely, the engager 30 can comprise rubber material having improved anti-gasoline permeability and the protector 20 can comprise rubber material having improved flame resistance. So in response to the features which are necessary to each portion, the appropriate rubber material is used. Accordingly, it is possible to provide the hose with a protector having the necessary characteristics by using cheap rubber materials.

Figure 24:
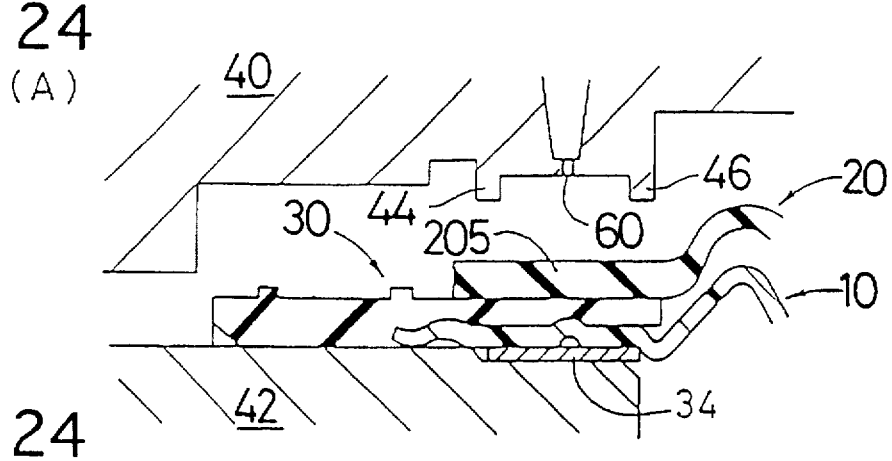
FIGS. 24(A) through 24(D) are cross sectional views which illustrates the outline the four parts of one step for producing a resin ring of a hose with a protector according to the Twenty-second Preferred Embodiment.
Figure 24:
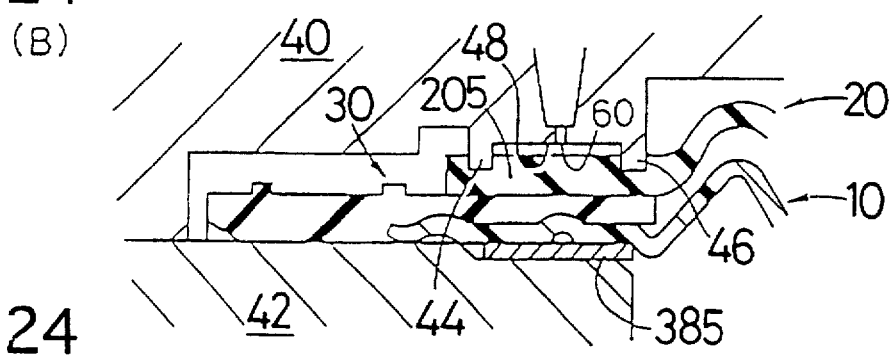
Figure 24:
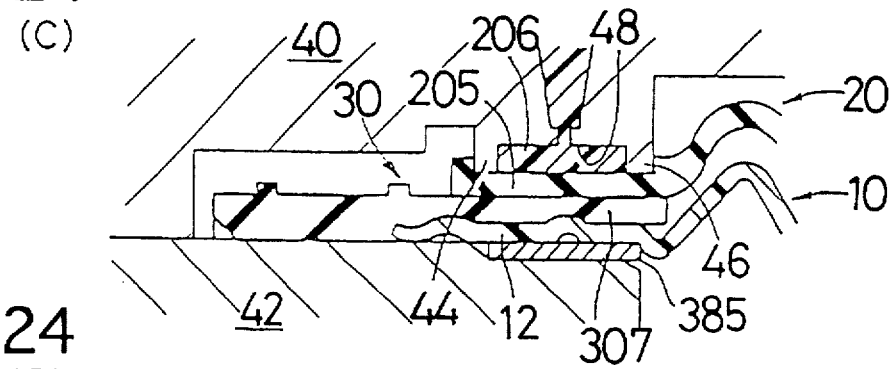
Figure 24:
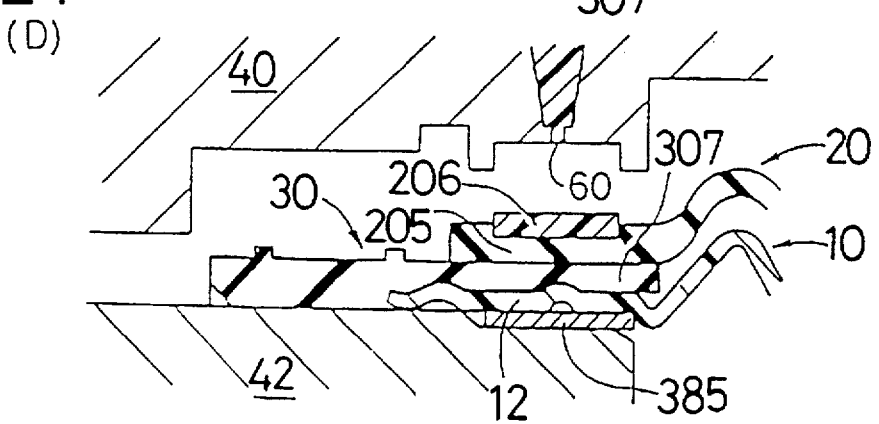

With reference to the method in which the resin ring 206 is injection molded and at the same time, edge portions 12 and 205 of the hose body 10 and the protector 20 respectively, together with the fixed portion 307 of the engager 30 are fixed in the clamped and pressed state by the resin ring 206 and the hard ring 385, it can be suitable to use the method shown in FIG. 24.

This method, as shown in FIG. 24 (A), comprises the following steps of: pressure members 44 and 46 are formed at the injection molding die 40; the hard ring 385, the hose body 10, the protector 20 and the engager 30 are set and die matched to the injection molding die 40 and 42; and at this time, at the pressure portion members 44 and 46, the edge portion 205 of the protector 20 is pressed down (refer to FIG. 24 (B)).

Inside of a cavity 48 which is formed between these pressed members 44 and 46, the resin material is injected from a filler hole 60 which is formed at the middle position of in the axial direction and in the inwardly radial direction so that the resin ring 206 is molded (refer to FIG. 24 (C)). At the same time, together with the hard ring 385, the edge portion 12 of the hose body 10, the fixed portion 307 of the engager 30 and the edge portion 205 of the protector 20 are pressed and fixed.

Based on this method, the melted resin injected from the filler hole 60 presses the engager 30 through the edge portion 205 of the protector 20 against the edge portion 12 of the hose body 10 so that this method can obtain the effect that the sealing between them is secured.

Twenty-third Preferred Embodiment

Figure 25:
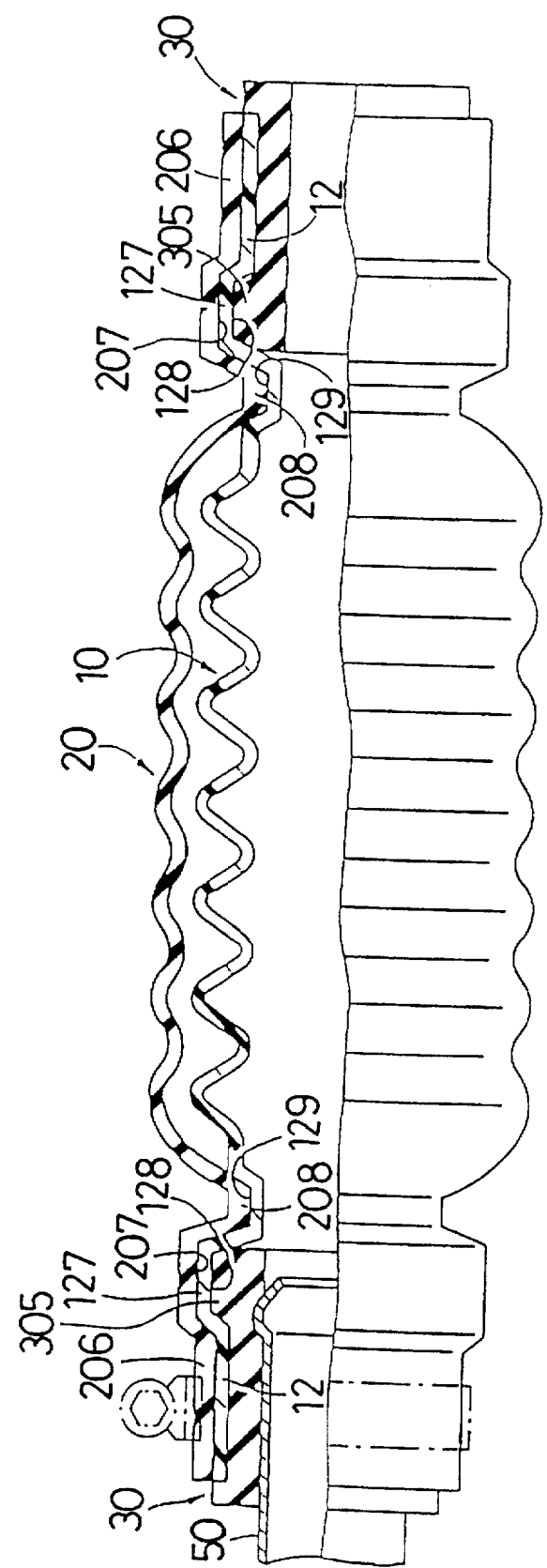
FIG. 25 is a broken fragmentary cross sectional view of a hose with a protector of a Twenty-third Preferred Embodiment.

FIG. 25 shows the hose with a protector of the Twenty-third Preferred Embodiment in the present invention. In this Twenty-third Preferred Embodiment, parts in the axial direction of the protector 20 and the cylinder shaped edge portions 12 and 12 of the hose body 10 are formed in convex curved shapes which project radially outwardly and annularly. And into the inside of the annular engaging concave portion 207 which is formed at the edge portion 206 of the protector 20 and which is in radial and inward direction, the convex curved portion 127 (engaging convex portion) of the edge portion 12 of the hose body 10 is inserted.

Into the inside of the inwardly and annularly engaging concave portion 128 of the edge portion 12 of the hose body 10, the annular and engaging convex portion 305 of the engager 30 is inserted. Accordingly, the engager 30, the edge portion 206 of the protector 20 and the edge portion 12 of the hose body 10 are fixed to each other.

At the edge portion 12 of the hose body 10, an annular and second engaging concave 129 which extends radially outward at the position adjacent to the engaging concave 128 is formed. Into the inside of this second engaging concave 129, the inward and second convex curved portions (engaging convex portions) 208 and 208 of the edge portion 206 of the protector 20 are inserted and fixed to each other.

Figure 26:
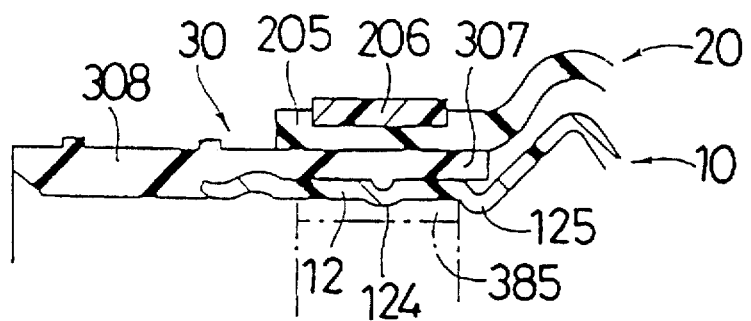
FIGS. 26(a) and 26(b) are a cross sectional views which illustrate a major portion in full and dotted lines of a modified version of a hose with a protector of the Twenty-third Preferred Embodiment.
Figure 26:
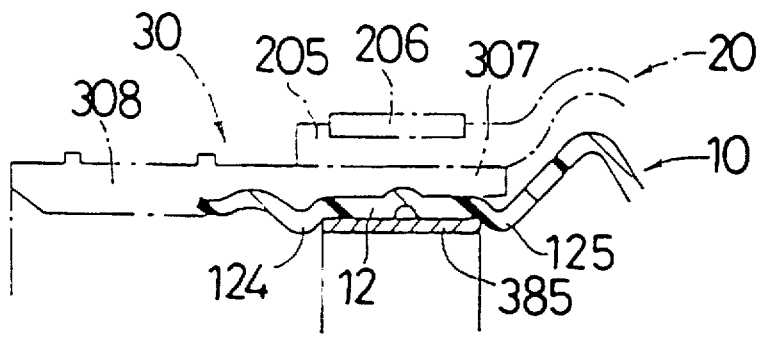

As shown in FIG. 26 (A), the middle part in the axial direction of the edge portion 12 in the hose body 10 is annularly curved inwardly in the radial direction and then it is possible for the filling of the engager 30 to bite into the inside of this concave portion 124. Also as shown in FIG. 26 (B), a pair of projections 125 and 124 which are radially inward and annular are provided the edge portion 12 so that the position of the hard ring 385 can be determined by using these projections 125 and 124.

Besides the above-mentioned Preferred Embodiments, the present invention can be applied to other hoses such as an air intake hose for an automobile and besides the above-mentioned materials, various kinds of materials can be used for the hose body and the protector in this invention. It will be apparent to one of ordinary skill in the art that many changes and modifications can be made thereto without departing from the spirit or scope of the present invention as set forth herein including the appended claims.

We claim:

1. A hose comprising a central portion and two end portions each located at opposite ends of said central portion, a tubular shaped outer body extending from said two end portions and across said central portion, a tubular shaped inner body fixed within said outer body and extending from said two end portions and across said central portion, said outer body being made of rubber elastic material, an engager located at said two end portions being made of rubber elastic material for receiving and sealingly engaging a nipple in said engager in a water-tight seal and the nipple being held within said engager at an interior surface of said engager by the elasticity of said rubber elastic material, said inner body being made of resin or metal and being coaxially located inside of said outer body, said inner body, said outer body, and said engager being fixed together at each of said two end portions by a pair of rings, one of said rings being located inside of said inner body and being made of resin or metal and the other of said rings being located outside of said outer body.

2. A hose according to claim 1, wherein said rubber elastic material is vulcanized rubber.

3. A hose according to claim 1, wherein said engager has a sealing portion which is clamped between said pair of rings so that said sealing portion and said nipple are sealed.

4. A hose according to claim 1, wherein an air layer space is located between said outer body and said inner body at said central portion.

* * * * *